US012563365B2

(12) United States Patent
Belt et al.

(10) Patent No.: US 12,563,365 B2
(45) Date of Patent: Feb. 24, 2026

(54) SYSTEMS AND METHODS FOR LOCALIZED INFORMATION PROVISION USING WIRELESS COMMUNICATION

(71) Applicant: BLIND INSITES, LLC., Plano, TX (US)

(72) Inventors: Darwin Wayne Belt, Plano, TX (US); April Ryan Hilton, Carrollton, TX (US); Jeffrey D. Hilton, Carrollton, TX (US); Jessica B. Hipp, Temple, NH (US)

( * ) Notice: Subject to any disclaimer, the term of this patent is extended or adjusted under 35 U.S.C. 154(b) by 0 days.

(21) Appl. No.: 18/230,323

(22) Filed: Aug. 4, 2023

(65) Prior Publication Data

US 2023/0379659 A1     Nov. 23, 2023

Related U.S. Application Data

(63) Continuation of application No. 17/963,425, filed on Oct. 11, 2022, now abandoned, which is a (Continued)

(51) Int. Cl.
        *G06F 16/9537*       (2019.01)
        *H04W 4/02*            (2018.01)
        *G06Q 10/109*         (2023.01)
(52) U.S. Cl.
        CPC ........ *H04W 4/025* (2013.01); *G06F 16/9537* (2019.01); *G06Q 10/109* (2013.01)
(58) Field of Classification Search
        CPC . G06F 16/9537; G06Q 10/109; H04W 4/025; H04W 4/029
        See application file for complete search history.

(56) References Cited

U.S. PATENT DOCUMENTS 7,525,425 B2 *    4/2009   Diem .................... H04L 67/535
                                                          342/357.44
7,937,067 B2      5/2011   Maier
                            (Continued)

FOREIGN PATENT DOCUMENTS

WO          2006110181 A2    10/2006

OTHER PUBLICATIONS

Ferreira et al; "Beacons and BIM Models for Indoor Guidance and Location", Date: Dec. 2018; Web Site: https://www.ncbi.nlm.nih.gov/pmc/articles/PMC6308471/.

(Continued)

*Primary Examiner* — Kris E Mackes
(74) *Attorney, Agent, or Firm* — Caldwell Intellectual Property Law

(57)                   ABSTRACT

A system for providing localized information using wireless communication features a computing device that interacts with a wireless signal generator in a navigable space. The device receives a location identifier and processes user-entered data linked to that location. It then generates a structured display that organizes multiple data signals, each categorized and arranged in a specific display order. Additionally, the system records contextual data elements and associates them with the structured display and location identifier, creating a comprehensive localized data record. This enables users to access relevant, context-aware information efficiently based on their location and input, enhancing navigation and situational awareness.

20 Claims, 7 Drawing Sheets

Related U.S. Application Data continuation of application No. 17/555,653, filed on Dec. 20, 2021, now Pat. No. 11,765,546, which is a continuation of application No. 17/179,578, filed on Feb. 19, 2021, now Pat. No. 11,212,646, application No. 18/230,323, filed on Aug. 4, 2023 is a continuation of application No. PCT/US2022/017284, filed on Feb. 22, 2022, which is a continuation of application No. 17/555,653, filed on Dec. 20, 2021, now Pat. No. 11,765,546, which is a continuation of application No. 17/179,578, filed on Feb. 19, 2021, now Pat. No. 11,212,646, and a continuation of application No. 16/783,938, filed on Feb. 6, 2020, now Pat. No. 11,392,658.

(56) References Cited

U.S. PATENT DOCUMENTS

| | | | | |
|---|---|---|---|---|
| 8,208,943 | B2 * | 6/2012 | Petersen | H04L 67/54 |
| | | | | 455/457 |
| 9,202,245 | B2 * | 12/2015 | Kostka | H04W 12/06 |
| 9,408,036 | B2 | 8/2016 | Hart | |
| 9,538,332 | B1 | 1/2017 | Mendelson | |
| 9,549,309 | B2 | 1/2017 | Karaoguz | |
| 9,648,581 | B1 * | 5/2017 | Vaynblat | H04L 67/535 |
| 9,681,265 | B1 * | 6/2017 | Davis | G06F 16/9537 |
| 10,064,002 | B1 | 8/2018 | Renaldi | |
| 10,185,921 | B1 * | 1/2019 | Heller | G07C 9/38 |
| 10,212,555 | B1 | 2/2019 | Rusu et al. | |
| 10,325,482 | B1 | 6/2019 | Knas | |
| 10,719,899 | B1 | 7/2020 | Dabell | |
| 2016/0169696 | A1 | 6/2016 | Butts, III et al. | |
| 2016/0187139 | A1 * | 6/2016 | Agulnik | G06Q 50/265 |
| | | | | 701/408 |
| 2017/0094459 | A1 | 3/2017 | Leclerc et al. | |
| 2017/0185992 | A1 * | 6/2017 | Campanaro | H04W 4/021 |
| 2017/0249651 | A1 * | 8/2017 | Pulitzer | G06Q 30/0203 |
| 2018/0067187 | A1 | 3/2018 | Oh | |
| 2018/0075063 | A1 | 3/2018 | Patel | |
| 2018/0176741 | A1 * | 6/2018 | Cremer | H04W 4/021 |
| 2018/0225717 | A1 | 8/2018 | Storti | |
| 2019/0171780 | A1 | 6/2019 | Santarone | |
| 2019/0297452 | A1 | 9/2019 | Gedikian | |
| 2019/0320310 | A1 | 10/2019 | Horelik | |
| 2020/0120170 | A1 * | 4/2020 | Amitay | H04L 63/101 |
| 2020/0168020 | A1 * | 5/2020 | Kennedy-Foster | H04W 12/08 |

OTHER PUBLICATIONS

J. Candy; "A Mobile Indoor Location-Based GIS Application", Date: Oct. 30, 2019; GIS Dept., British Columbia Institute of Technology, BC. Canda. V5G 3H2; Web Site: https://pdfs.semanticscholar.org/c6ce/e0efa3be1c2076d76589b66edf1f97be09df.pdf.

* cited by examiner

200

Block 224a

Fields

228

232

Block 224b

Fields

228

232

400

405 — Receiving a First Signal from at Least a First Transmitter at a First Location 410 — Inputting at Least a User Datum 415 — Instantiating a Display Data Structure having a Plurality of Display Signals 420 — Recording at Least an Element of Contextual Data 425 — Generating a Localized Data Record

SYSTEMS AND METHODS FOR LOCALIZED INFORMATION PROVISION USING WIRELESS COMMUNICATION

CROSS-REFERENCE TO RELATED APPLICATIONS

This application is a continuation of U.S. patent application Ser. No. 17/963,425, filed on Oct. 11, 2022, which is a continuation of U.S. patent application Ser. No. 17/555,653, filed on Dec. 20, 2021, now U.S. Pat. No. 11,765,546, issued on Sep. 19, 2023, which is a continuation of U.S. patent application Ser. No. 17/179,578, filed on Feb. 19, 2021, now U.S. Pat. No. 11,212,646, issued on Dec. 28, 2021, which is a continuation of U.S. patent application Ser. No. 16/783, 938, filed Feb. 6, 2020, now U.S. Pat. No. 11,392,658, issued on Jul. 19, 2022. Each of Non-provisional Application Ser. No. 17/555,653, Non-provisional Application Ser. No. 17/179,578, and Non-provisional Application Ser. No. 16/783,938 is incorporated herein by reference in its entirety.

This application is a continuation of of International Application No. PCT/US22/17284 filed Feb. 22, 2022, and entitled "SYSTEMS AND METHODS FOR LOCALIZED INFORMATION PROVISION USING WIRELESS COMMUNICATION," which claims the benefit of priority of Non-provisional application Ser. No. 17/555,653, filed on Dec. 20, 2021, and entitled "SYSTEMS AND METHODS FOR LOCALIZED INFORMATION PROVISION USING WIRELESS COMMUNICATION," the entirety of which is incorporated herein by reference, which is a continuation of Non-provisional application Ser. No. 17/179,578 filed on Feb. 19, 2021 and entitled "SYSTEMS AND METHODS FOR LOCALIZED INFORMATION PROVISION USING WIRELESS COMMUNICATION," the entirety of which is incorporated herein by reference, and to which this application further claims priority.

FIELD OF THE INVENTION

The present invention generally relates to the field of telemetry, selective communication, and dynamic data storage. In particular, the present invention is directed to systems and methods for localized information provision using wireless communication.

BACKGROUND

Frequently, information a user needs is highly context dependent, relying on the user's immediate location and current needs, and may shift rapidly as the user progresses from one location or task to another. Traditional search engines and websites generally fail to provide relevant information in a sufficiently precise or intuitive manner.

SUMMARY OF THE DISCLOSURE

In an aspect, A system for localized information provision using wireless communication, the system including a computing device including circuitry designed and configured to: download, at a first location, a localized data record associating at least an element of contextual data with a display data structure, wherein the contextual data includes source reference data regarding pharmaceuticals; receive, from a wireless signal generator located at a second location, a location identifier; retrieve the display data structure from the localized data record; record at least an element of contextual data; and instantiate the display data structure as a function of the at least an element of contextual data and the localized data record.

In another aspect, A method for localized information provision using wireless communication, the method including: downloading, using a computing device including circuitry, at a first location, a localized data record associating at least an element of contextual data with a display data structure, wherein the contextual data includes source reference data regarding pharmaceuticals; receiving, using the computing device, from a wireless signal generator located at a second location, a location identifier; retrieving, using the computing device, the display data structure from the localized data record; recording, using the computing device, at least an element of contextual data; and instantiating, using the computing device, the display data structure as a function of the at least an element of contextual data and the localized data record.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein select display signals, such as provided to tabs or views on a user device, based on an identity of a local transmitter, which may be combined with one or more elements of contextual data such as user information or the like. Selection of a first display signal may be predicated, without limitation, upon emergency status, user habits, local schedule information, or combinations of multiple factors.

Figure 1:
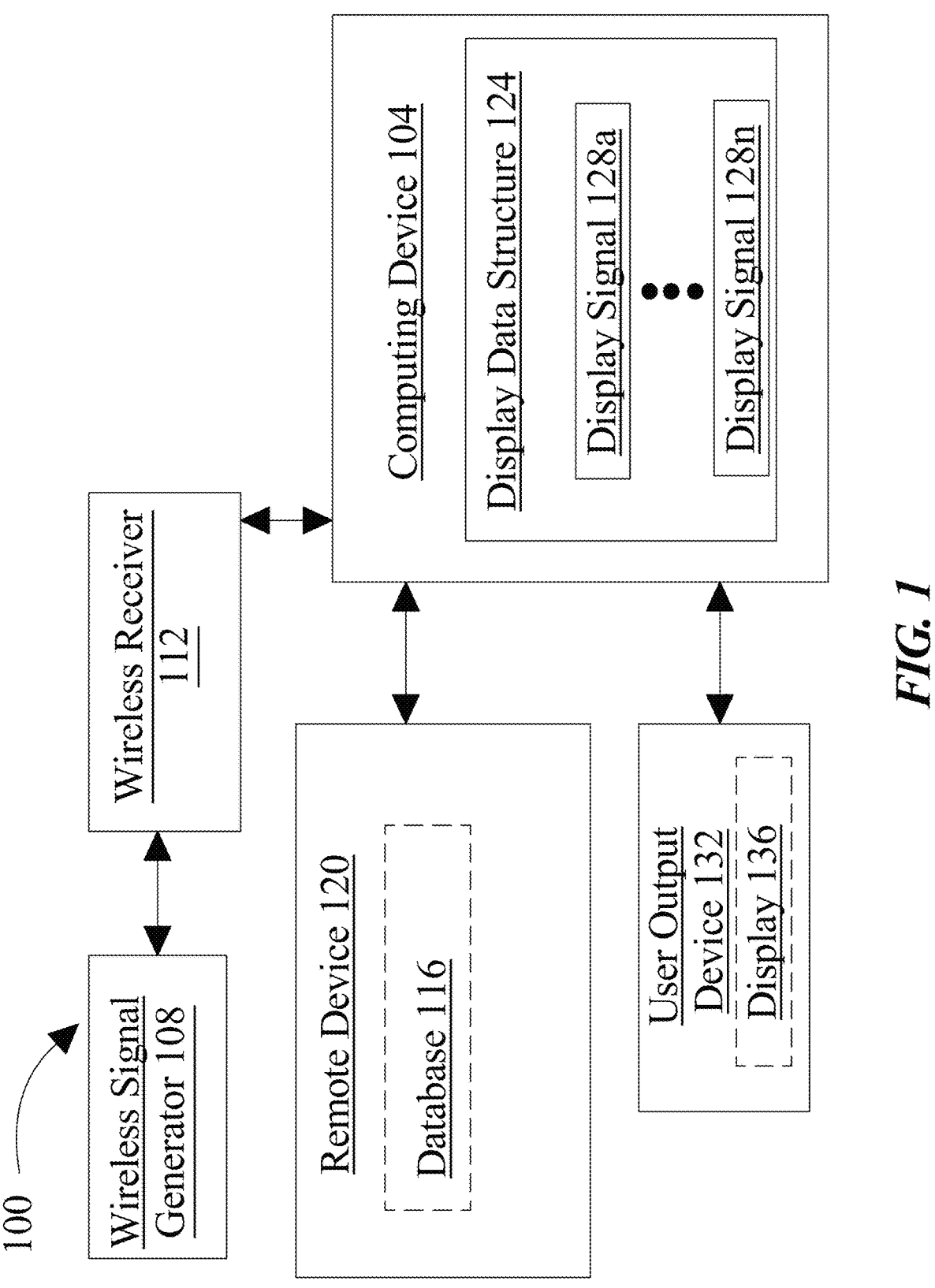
FIG. 1 is a block diagram of an exemplary embodiment of a system for localized information provision using wireless communication.

Referring now to FIG. 1, an exemplary embodiment of a system 100 for localized information provision using wireless communication is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive, from a wireless signal generator 108 located in a navigable space, a location identifier. A "wireless signal generator," as used in this disclosure, is a device that outputs a signal using electromagnetic radiation; signal may be sent using any frequency usable in communication, including without limitation radio waves, microwaves, infrared waves, and visible light. At least a wireless signal generator 108 may include an antenna. At least a wireless signal generator 108 may include a passive transmitter, such as those used for passive radio frequency identification ("RFID") or near field communication ("NFC") tags. In some embodiments, a passive transmitter includes an antenna in which electric current is induced by magnetic coupling from an antenna, such as antenna of wireless receiver 112; the induced electric current may power the passive transmitter, which may use additional circuitry such as a logic circuit to analyze the signal and generate a response signal. Logic circuit may be any logic circuit as described above regarding driver circuit. At least a wireless signal generator 108 may output signal by modifying electromagnetic radiation using means other than an antenna. For instance, at least a wireless signal generator 108 may absorb and/or reflect ambient or directed electromagnetic radiation in visible or other spectra; wireless signal generator 108 may emit and/or reflect such electromagnetic radiation in spectrally altered pattern that may be detected using a code reader, antenna, or other device or component of wireless receiver 112. This may be accomplished, in a non-limiting example, using one or more pigments disposed on a surface of wireless signal generator 108; one or more pigments may include, as a non-limiting example, two or more contrasting pigments, which may be provided in a one-dimensional or two-dimensional distribution. Non-limiting examples of such pigmented arrangements may include quick-read codes and/or universal product codes, as rendered on physical objects, electronic displays, and the like.

Still referring to FIG. 1, a response signal may be output by the same antenna. A response signal may be output by an additional antenna; in other words, as described above for wireless transmitter, antenna may include multiple antennas. In some embodiments, a passive transmitter has a plurality of antennas to enable the transmitter to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, wireless signal generator 108 may include an active transmitter. An active transmitter may be a transmitter having a power source other than an interrogation signal; power source may be any power source as described above. An active transmitter may use an antenna to broadcast a signal periodically. An active transmitter may use an antenna to listen for incoming signals and transmit in response to a detected signal. Active transmitter may perform both actions; for instance, active transmitter may periodically transmit a first signal, and also transmit one or more second signals in response to signals wireless signal generator 108 receives. Wireless signal generator 108 may include a transceiver, which may be any transceiver as described above. Wireless signal generator 108 may include a beacon using any beacon protocol as described above.

Still referring to FIG. 1, wireless signal generator 108 may include a memory. Memory may be any memory as described below. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section. The limited access section may be limited to users of the system 100, or in other words may be generally writable, but only to users of the system 100, who may have the requisite access codes as a result of joining the system 100 as users; the users may alternatively be granted the access codes by the system 100 to update information on wireless signal generator 108 only when authorized by the system, and otherwise be unable to update the memory; in this way, the system 100 may be able to update information on wireless signal generator 108 memory efficiently by way of the receiver while maintaining security against misuse of the memory. In some embodiments, preventing users from being able to write over memory enables the memory to be free from intentional or unintentional corruption or inaccuracy, and enables the system 100 to ensure that certain information is always available to users of wireless signal generator 108. In some embodiments, writable sections enable the system 100 itself or users of the system 100 to correct, augment, or update information as described in further detail below.

Continuing to refer to FIG. 1, at least a wireless signal generator 108 may be configured to transmit a signal. Signal may be a return signal in response to a prompt by another wireless communication device, including without limitation wireless receiver 112. Signal may be a return signal in response to interrogation by an interrogator included in another wireless communication device, including without limitation wireless receiver 112. Signal may be any wirelessly transmitted signal, including without limitation any signal transmitted through electromagnetic radiation, magnetic coupling, capacitive or other electronic coupling, or any other wireless means. Signal may include a location; identifier may identify at least a wireless signal generator 108, an item to which wireless signal is attached and/or with which wireless signal is associated, a location at which wireless signal generator 108 is located, or the like. A "location identifier," as used in this disclosure, is an identifier of a location of at least a wireless signal generator 108. Location identifier may identify a specific location; specific location may include, without limitation, a location to which at least a wireless signal generator 108 is attached or affixed, including a location relative to a navigable space and/or a location relative to an item. Specific location may be static; other features may be associated with specific location. Specific location may be location at and/or attached to an item, which may include a movable item such as a box, crate, portable appliance, element of furniture, bag, a vending machine, a trash or recycling receptacle or the like; thus, location identifier may identify a location that can move with the item to which it corresponds, as the item and wireless signal generator 108 are moved. References to "location-specific data" as made in this disclosure may further include and/or be read as references to item-specific data, which may include information concerning contents of an item, instructions for use of an item, instructions for assembly and/or maintenance of an item, information for accessibility and/or use of item given one or more forms of impairment such as visual and/or mobility impairment, or the like. Transmitters may alternatively or additionally be located at and/or associated with items that in turn are associated with a particular navigable space, but may or may not be at that particular navigable space; examples may include, without limitation, playbills associated with a concert hall, literature associated with a museum, church or organization, programs associated with a sports venue, menus associated with a restaurant, ads and mailers associated with a business, convention lanyards & handouts for or associated with events at a hotel or convention center, instructions at medical facilities such as without limitation a COVID-19 vaccine distribution center, or the like.

With further reference to FIG. 1, location identifier may identify location at and/or association with an item, which may include without limitation any item as described herein, including without limitation any item with which reference data and/or source reference data may be associated. For instance, items at which location may be identified using location identifier may include, without limitation, medication and/or pharmaceutical products, medical devices, medical equipment, containers for pharmaceutical and/or medication products, parts for manufacturing appliances, automobiles, or the like, and/or such appliances, automobiles or the like, food products and/or ingredients thereof, tools, and/or any other movable, portable, and/or stationary item.

Still referring to FIG. 1, location identifier may take the form of a unique identifier that uniquely corresponds to at least a wireless signal generator 108 for the purposes of the system 100; this may be accomplished using methods including but not limited to Globally Unique Identifiers (GUIDs), Universally Unique Identifiers (UUIDs), which may be identifiers including numbers generated according to a standard which makes the chances of another UUID or GUID being identical to the instant identifiers negligible to the point of near-certain impossibility, or by maintaining a data structure, table, or database listing all transmitter identifiers and checking the data structure, table listing, or database to ensure that a new identifier is not a duplicate. A database may be operated, without limitation, at a remote device 120, on computing device 104, or in any other suitable manner.

Further referring to FIG. 1, an identifier of wireless signal generator 108 may alternatively or additionally identify a group of wireless signal generators including or included in at least a wireless signal generator 108. Group of wireless signal generators may be commonly owned; for instance, group of wireless signal generators may all be owned by a single person or entity. Owner of a transmitter and/or group of wireless signal generators may have exclusive ability to modify information publicly associated with transmitters, where information publicly associated with transmitters includes information linked to identifier in any data structure as set forth in further detail below, or stored and transmitted by the transmitter, and available to all users of computing device like computing device 104. Alternatively or additionally, rights to change publicly available information may be possessed by individuals and/or groups having particular authentication credentials or the like. Information on data structures as described herein may be organized according to owner identifiers and/or identifiers of groups of transmitters; in an embodiment, this manner of organization may make retrieval of data from data structures more efficient. For instance, and without limitation, owner identifier may be linked in a data structure or table to a location or identifier of a data structure and/or database relating to that owner identifier. As a further example, a single server or remote device, as described in further detail below, may include all information and/or data structure portions or instances pertaining to a particular owner identifier. As a non-limiting example one or more transmitters of at least a wireless signal generator 108 may be formatted owner identifiers in the textual element prior to provision of the one or more transmitters to the owner; alternatively or additionally a mechanism may be provided in an application or the like allowing an owner to format his or her own transmitters with the textual element identifying him or her as the owner. An owner, as used herein, may include any individual, entity, organization, venture, business, or the like, including without limitation a retail establishment or chain, a university, a hotel, a bank, an organization such as a nonprofit organization, a government, governmental organization, a quasi-governmental organization, a religious order and/or division thereof, an office and/or office space, or any other example that may occur to a person of ordinary skill in the art upon reviewing the entirety of this disclosure. As a non-limiting example, use of multiple transmitters by a single organization may be implemented as described in U.S. Nonprovisional application Ser. No. 16/861,940, filed on Apr. 29, 2020, and entitled "METHODS AND SYSTEMS FOR PROVIDING WIRELESS GUIDANCE IN A RETAIL SPACE," the entirety of which is incorporated by reference herein. A location identifier may be shared, without limitation, by the entirety of an organization, all locations of an organization, all locations of an organization on a single continent and/or in a single country, state, site, and/or any combination thereof. Signal may include other data in addition to identifier.

Information on first wireless signal generator 108 may include, for instance as part of a plurality of textual elements, at least a second identifier. At least a second identifier may include at least one of a site identifier and/or an organization identifier; for instance, at least a second identifier may include a site identifier, an organization identifier, both a site identifier and an organization identifier, or neither. At least a second identifier may include either or both of an organization identifier and a site identifier as well as any other identifier as described in this disclosure. At least a second identifier may include any identifier described herein, any two identifiers described herein, and/or a combination of three or more identifiers. Any identifier suitable for use as at least a second identifier may alternatively or additionally be retrieved using another identifier in plurality of textual elements. For instance, and without limitation, a site identifier may be retrieved from any data structure described in this disclosure using a wireless signal generator 108 identifier and/or an organization identifier, an organization identifier may be retrieved from any data structure described in this disclosure using a wireless signal generator 108 identifier and/or a site identifier, or the like.

Wireless signal generator 108 may include an organization identifier, which as used herein is an identifier of an entity operating and/or responsible for wireless signal generator 108; organization identifier may be implemented in any manner suitable for implementation of wireless signal generator 108 identifier. Organization identifier may pertain to an organization and/or entity operating retail site and/or to an organization and/or entity that does not operate retail space. For instance, a certain lot of wireless signal generators 108 may be operated by a vendor or sub-contractor at retail space and may contain organization identifiers relating to that vendor or sub-contractor.

Still referring to FIG. 1, information on first wireless signal generator 108 may include a site identifier, which may identify a retail space location, department, regional division and/or arrangement of an entity operating retail space, or the like. Site identifier may be implemented in any manner suitable for implementation of wireless signal generator 108 identifier. In an embodiment, site identifier may be used in combination with organization identifier to distinguish entities or persons in charge of and/or responsible for first wireless signal generator 108 from entities and/or persons in charge of retail space or other area associated with site identifier. For example, where organization identifier pertains to an organization that does not operate site identifier may relate to a proprietor of the site; the proprietor may be operating one or more elements of spatial information data structure and/or planogram, may be connected to a different organization identifier. As another example, site identifier may link to one set of spatial info data for the establishment, while organization identifier may link to another for a display area, display case, or the like, or vice-versa. This may permit overall planogram updates, localized planogram updates, stock storage and/or rearrangement of overall spaces and/or localized spaces to be managed by persons and/or entities in charge of them, and may aid in coordination of such actions while allowing each entity to maintain control over its respective goods, display areas, storage areas, or other possessions. As set forth in further detail herein, first wireless signal generator 108 may include additional fields and/or data, including without limitation product data and/or current status data.

With continued reference to FIG. 1, system may include and/or communicate with a site data structure. Site data structure may be implemented in any manner suitable for implementation of spatial information data structure, product data structure, user data structure, or the like. Site data structure may be used to store data pertaining to retail space and/or other site containing wireless signal generator 108 and/or retail space. Site data structure may include at least a field for site identifier; in an embodiment, site identifier field may be included in and/or linked to records and/or rows in tables of site data structure such that a query including site identifier may retrieve records, rows, and/or other elements of data relating to a site identified by site identifier, such as without limitation retail space. Alternatively or additionally, an instance and/or copy of site data structure may include only records associated with a particular site identifier; for instance, a copy and/or instance of site data structure deployed on and/or downloaded to a remote device located at retail space may contain only records related to and/or linked to a site identifier of that retail space. A site identifier may double in such circumstances as an identifier of a site data structure containing records linked to that site identifier, which devices in system, such as POS devices and/or portable computing device may use to look up and/or locate an instance of such a site-specific site data structure. Alternatively or additionally, any site data structure and/or portion thereof may be downloaded to portable computing device, for instance as described in further detail below.

Still referring to FIG. 1, site data structure may include one or more fields that are useable to identify other components, objects, and/or identifiers within system. Fields may include a field to contain site identifier; for instance, any site identifier in site data structure and/or records associated therewith may be further linked to and/or included with an organization identifier of an entity associated therewith. Fields may include a field to contain a wireless signal generator 108 identifier, for instance and without limitation linking in a table or other element of site data structure a list of wireless signal generator 108 identifiers associated therewith; wireless signal generator 108 identifiers may be further associated with product and/or planogram data as described in further detail in this disclosure. Fields may include a user data link field, which may contain one or more elements of data suitable for association with a user and/or user data, such as without limitation user data structure; examples of data that may be maintained in user data link field may include a user identifier, which may be implemented in any way suitable for implementation of wireless signal generator 108 identifier. User data as listed in site data structure may also include organization role information, which may be linked to user data link field. Alternatively or additionally, such role information may be linked to a combination of identification fields, such as a combination of organization identifier with user data link field, site identifier with user data link field, or the like; combination may include, without limitation, concatenation. As a further example of combination, an owner identifier, usable to link to data describing a person and/or entity responsible for a site, may be a combination of site identifier and organization identifier; this may be computed by portable computing device or other devices reading this material, sparing space on wireless signal generator 108, for instance. Other such combination identifiers may be employed, as may occur to persons skilled in the art upon reviewing the entirety of this disclosure.

Continuing to refer to FIG. 1, site data structure may include and/or link to one or more data structures and/or data describing site-specific data, such as without limitation product data structure, spatial information data structure, and/or planogram. Such information may be linked to site identifier as described above. Some such data may be private and/or limited in access to particular persons and/or persons in particular roles; for instance, planogram and/or data contained therein may be visible only to employees of an entity operating retail space or the like. Other data may be publicly visible but editable only by persons having such access; for instance, product data and/or data included in and/or linked to product data structure may be visible generally to users such as customers, but editable only by employees of an entity operating retail space or the like. Public information and/or authorized private information may be retrieved by a user via a user device; user device may determine data associated with retail space using site identifier, may query using product identifier and/or a wireless signal generator 108 identifier or the like. As a further non-limiting example, public information for a given retail space may be looked up and/or retrieved using one or more organization identifiers. For instance portable computing device may receive data from a wireless signal generator 108 in one geographical location having an organizational identifier, then may arrive at a different geographical location, and may find at least a local site identifier of a site at or near the different geographical location that is associated with the organization identifier, which may be retrieved, for instance from an organization data structure as described in further detail below.

With continued reference to FIG. 1, system may include and/or communicate with an organization data structure. Organization data structure may be implemented in any manner suitable for implementation of spatial information data structure, product data structure, user data structure, site data structure, or the like. Organization data structure may be used to contain information pertaining to an organization that operates retail space and/or wireless signal generator 108. Organization data structure may include at least a field for organization identifier; in an embodiment, organization identifier field may be included in and/or linked to records and/or rows in tables of organization data structure such that a query including organization identifier may retrieve records, rows, and/or other elements of data relating to an organization identified by organization identifier, such as without limitation an organization operating retail space. Alternatively or additionally, an instance and/or copy of organization data structure may include only records associated with a particular organization identifier; for instance, a copy and/or instance of organization data structure deployed on and/or downloaded to a remote device located at retail space may contain only records related to and/or linked to an organization identifier of an entity operating that retail space. Alternatively or additionally, any site data structure and/or portion thereof may be downloaded to portable computing device, for instance as described in further detail below. An organization identifier may double in such circumstances as an identifier of an organization data structure containing records linked to that organization identifier, which devices in system, such as POS devices and/or portable computing device may use to look up and/or locate an instance of such an organization-specific organization data structure.

Still referring to FIG. 1, organization data structure may include one or more fields that are useable to identify other components, objects, and/or identifiers within system. Fields may include a field to contain a site identifier; for instance, any site identifiers in organization data structure and/or records associated therewith may be further linked to and/or included with an organization identifier of an entity associated therewith, and thus useable to identify and/or retrieve records from a related site data structure. Fields may include a field to contain a wireless signal generator 108 identifier, for instance and without limitation linking in a table or other element of organization data structure a list of wireless signal generator 108 identifiers associated therewith. Fields may include a user data link field, which may contain one or more elements of data suitable for association with a user and/or user data, such as without limitation user data structure; examples of data that may be maintained in user data link field may include a user identifier, which may be implemented in any way suitable for implementation of wireless signal generator 108 identifier. User data link field and/or data used therewith may be used as described above for site data structure.

In an embodiment, and continuing to refer to FIG. 1, product information data may include one or more elements of information provided by manufacturers of products. For instance, site data structure, organization data structure, and/or one or more other data structures described in this disclosure may contain information received from a manufacturer; alternatively or additionally a remote device and/or portable computing device may receive one or more elements of data from a manufacturer device, which may include any device suitable for use as a remote device, and/or from a manufacturer data structure, either of which may be exterior to system. A manufacturer data structure and/or device may be referred to from a list of products sold at each location or organization. For instance, either or both of site data structure and organization data structure may contain data linking products, sets of products, and/or wireless signal generator 108 identifiers, to one or more manufacturer data structures and/or devices, from which portable computing device, a remote device, or the like may retrieve product information data.

Still referring to FIG. 1, one or more of site data structure, organization data structure, and/or other data structures as described in this disclosure may include data, such as site-specific data, to be used by people that are blind or visually impaired. Such data may be provided by an organization that is the "owner" of the wireless signal generator 108, but it may also be provided by an outside organization the "owner" organization gives permission. In an embodiment, this may enable a group such as the National Federation of the Blind (NFB), American Council of the Blind (ACB), American Foundation for the Blind (AFB) or others to add navigational information that sighted users do not need nor want to see on their display. A user may be able to enable receipt of such information by portable computing device, for instance as permitted by credentials such as membership in one of the above-described organizations and/or groups. Additional site-specific information such as obstacles, smells or sounds nearby, and/or navigational instructions may be provided to portable computing device and/or to user via portable computing device, to aid a blind and/or visually impaired user in navigation and/or use of retail space.

With continued reference to FIG. 1, read access and/or write access to any data on any of the above described data structures may be publicly available, available to specific users, and/or available to users according to role-based credentials. Data may be retrieved, modified, and/or otherwise manipulated on any of the above-described data structures using any combination of the above-described data fields and/or data elements as queries.

With continued reference to FIG. 1, data to be transmitted by at least a wireless signal generator 108 may be stored on at least a wireless signal generator 108 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a wireless signal generator 108 and/or computing device 104.

Still referring to FIG. 1, computing device 104 may receive location identifier from wireless signal generator 108 via a remote device, such as another computing apparatus as described in this disclosure, which may transmit location identifier to computing device 104 by way of a network and/or by any direct and/or indirect form of electronic communication. Alternatively or additionally, computing device 104 may receive location identifier from wireless signal generator 108 by localized wireless communication. For instance, and without limitation, computing device 104 may incorporate and/or otherwise be in communication with a wireless receiver 112, where "in communication" signifies ability to send signals to, and receive signals from, wireless receiver 112, either directly or via an intermediate device. For instance, and without limitation, wireless receiver 112 may be incorporated in an additional computing device 104 such as a user mobile phone, smartphone, tablet, personal digital assistant, and/or any other computing device 104, computing device 104, receiver, or device as described anywhere in this disclosure, which may connect to computing device 104 via a network, which may be a local area network, a wide area network, the Internet, or any other network passing electronic wired and/or wireless communication between devices. Computing device 104 may be electronically coupled to wireless receiver 112, and/or in wireless communication with wireless receiver 112; computing device 104 may perform wireless communication with wireless receiver 112 using any suitable protocol, including without limitation BLUETOOTH protocols as described below.

Continuing to refer to FIG. 1, wireless receiver 112 may have an antenna. Wireless receiver 112 may include a wireless interrogator; in other words, the antenna may be capable of inducing a current in an antenna of a passive transmitter through magnetic coupling, capacitive coupling, or other means. Wireless receiver 112 may be able to receive the signal transmitted by one or more transmitters as described below using the antenna. In some embodiments, the wireless receiver 112 can transmit as well as receive signals. Wireless receiver 112 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Washington. Transceiver may further implement a "beacon" protocol; as a non-limiting example, the beacon protocol may be implemented using the IBEACON protocol produced by Apple, Inc. of Cupertino, California, the EDDYSTONE protocol produced by Google, Inc. of Mountain View, California, or a similar protocol. Antenna may include a plurality of antennas; for example, and without limitation, antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, wireless receiver 112 may include both an antenna for receiving from and/or transmitting signals to a transmitter and a transceiver that may be used for communicating with a mobile computing device 104, for instance as described below. Wireless receiver 112 may include any device capable of or configured to receive any signal in the form of electromagnetic radiation, including without limitation visible spectrum light, infrared light, radio waves, or signals in any other portion of the electromagnetic spectrum, capacitive or magnetic inductance, or any other form of wireless communication that may be established between two electronic devices or components.

In an embodiment, and still referring to FIG. 1, wireless receiver 112 may scan wireless signal generator 108 using one or more optical and/or radiation-based scanning protocols and/or components. For instance, and without limitation wireless receiver may include and/or utilize one or more components performing light detection and ranging (LIDAR) processes. LIDAR may scan and/or return three-dimensional shapes and/or distances in three dimensions. In an embodiment, wireless signal generator 108 may include a three-dimensional form; wireless receiver 112 may be trained to lock on such a three-dimensional shape and return a specific location thereof and/or information encoded in a shape thereof within a set tolerance. In an embodiment, system 100 and/or any component of system may utilize location of computing device, as determined according to any process and/or technology described herein including without limitation GPS and use LIDAR to determine a relative location wireless signal generator 108. System 100 may alternatively or additionally use triangulation of multiple three-dimensional markers at locations of at least a wireless signal generator 108. Information encoded on such three-dimensional shapes may include any location identifier, which may alternatively or additionally be determined by location-detection means using LIDAR and/or other processes described herein.

Still referring to FIG. 1, wireless receiver 112 may include a driver circuit. Driver circuit is an electric circuit, electrically coupled to antenna, which processes electric signals induced in antenna by wireless signals and processes the electric signals. In other words, driver circuit may be any electrical circuit configured to wirelessly receive a signal from a transmitter, as described in further detail below, via antenna. Where wireless receiver 112 includes a wireless interrogator, driver circuit may further be configured to wirelessly transmit an interrogation signal via the antenna to a passive transponder; the interrogation signal may provide electrical power to the passive transponder. Driver circuit may further be configured to wirelessly receive a return signal from the transponder via the antenna.

With continued reference to FIG. 1, driver circuit may include analog components, digital components, or both. For instance, driver circuit may include one or more filters (not shown), such as a Butterworth filter, a Chebyshev filter, a band filter, or the like, to filter out noise or selectively receive particular frequencies or ranges of frequencies. Driver circuit may include one or more amplifiers. Driver circuit may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like. Logic circuit may include memory, which may be any memory as described below in reference to FIG. 4. Logic circuit may include a computing device 104 as described below in reference to FIG. 4. In some embodiments, the wireless receiver 112 includes a computing device 104; the computing device 104 may be any computing device 104 as described below in reference to FIG. 4. As a non-limiting example, the wireless receiver 112 may be a mobile computing device 104 such as a mobile phone, "smartphone," "smartwatch," or tablet; wireless receiver 112 may be incorporated in a mobile computing device 104. Wireless receiver 112 may be incorporated in a special-purpose device, such as handheld device or device mounted on a finding aid that, as a non-limiting example, is wirelessly or otherwise coupled to a mobile or computing device 104. Computing device 104 may be a microcontroller.

Still referring to FIG. 1, wireless receiver 112 may include a power source. Power source may include a power storage device; the power storage device may include a battery. Power storage device may include a capacitor; for instance, the power storage device may include an ultra-capacitor. Power storage device may include a magnetic power storage device, such as a device that incorporates an inductor. In some embodiments, power source includes a photovoltaic device; the photovoltaic device may be any device that converts light to electric power. Power source may include power provided by an electrical network, for example including electric power accessed via a wall-plug; the electrical power may be alternating current "mains" power, or power generated by solar panels, wind turbines. Wireless receiver 112 may charge wirelessly; for instance, the wireless receiver 112 may charge inductively. Wireless receiver 112 may include an inertial power source that generates mechanical or electrical power from movement of wireless receiver 112, including without limitation an inertial power source that generates power from walking or swinging a cane on which inertial power source is mounted. Wireless receiver 112 may include an optical capture device, such as a camera, optical scanner, laser scanner, or the like.

With continued reference to FIG. 1, wireless receiver 112 is configured to receive a signal from at least a wireless signal generator 108. In some embodiments, where at least a wireless signal generator 108 includes a passive transmitter as described in further detail below, wireless receiver 112 may receive the signal by producing an interrogation signal using an interrogator, and receiving the signal generated by the passive transmitter in return. In other embodiments, where at least a wireless signal generator 108 includes an active transmitter as set forth in further detail below, wireless receiver 112 listens for the transmission frequency of at least a wireless signal generator 108 and inputs the signal upon receiving the signal output by at least a wireless signal generator 108. Wireless receiver 112 may exchange signals with at least a wireless signal generator 108; for instance, wireless receiver 112 may transmit a query to at least a wireless signal generator 108 and receive data in response to the query. Wireless receiver 112 may similarly receive a signal from a second transmitter or from additional transmitters situated in a navigable space, as described in further detail below. Wireless receiver 112 may be configured to receive content data from at least a wireless signal generator 108 or a second transmitter. In an embodiment, and as described above, computing device 104 may be configured to receiving location identifier by wirelessly transmitting, via an antenna communicatively connected to the computing device 104, an interrogation signal providing electrical power to the wireless signal generator 108 and wirelessly receiving from the wireless signal generator 108, and via the antenna, a return signal.

Alternatively, or additionally, and still referring to FIG. 1, wireless receiver 112 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 112 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 112 receives a return signal including a unique identifier and processes that return signal, wireless receiver 112 may similarly obtain the unique identifier by way of a code reader and process the unique identifier in a like manner.

In an embodiment, and further referring to FIG. 1, one or more data entries in data structures described herein, including without limitation wireless signal generator 108, a database, a data record, and/or portable computing device may be encrypted and/or decrypted using a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Continuing to refer to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Further referring to FIG. 1, a user providing user-entered data, and/or a computing device operated thereby, may encrypt user-entered data; decryption may be available to a user, user group, or other entity or group of entities permitted to access information, data records, display data structures, and/or display signals as described in further detail below.

Still referring to FIG. 1, computing device 104 may be designed and configured to parse a signal received from at least a wireless signal generator 108 for at least a textual element. Computing device 104 may be designed and configured to receive first signal from at least a wireless signal generator 108; receiving a signal from a transmitter, as described herein, may include receiving signal via receiver, as communicatively connected to computing device 104 as described above. For instance, a receiver connected directly, wirelessly, or via a network to computing device 104 may receive a signal from a transmitter via passively or actively scanning transmitter, and then relay that signal to the computing device 104; e.g., a first user may scan or otherwise receive a signal from a transmitter using a first computing device 104, such as a smartphone, which may then transmit the signal, or a message based on the signal, to computing device 104. At least a textual element may include any datum or data that may be rendered as text, including without limitation numerical text, as any character or string of characters in any written language, as any punctuation, diacritical symbols, or other markings associated with any form of written text, and the like. Textual data may include a unique identifier such as without limitation location identifier.

Further referring to FIG. 1, wireless signal generator 108 is located in a navigable space. A navigable space may include, for instance and without limitation a room containing wireless signal generator 108, such as without limitation an office, a classroom, a cafeteria, an exercise room, a dance room, a multipurpose room, a lecture hall, a laboratory, a game room, bathroom, storage room, or the like. Navigable space may include, without limitation, an inter-room space such as a corridor, atrium, lobby, or court. Navigable space may include without limitation a stadium, arena, rink, convention center, warehouse, data center, office, dining hall, restaurant, dining hall, concert hall, auditorium, retail space, building, office park, and/or campus. As noted above, navigable spaces may be nested within one another. For instance, a navigable space containing wireless signal generator 108 may include a room that is contained on a floor, in an office, in a suite of rooms, or the like, which may represent a navigable space within which navigable space containing wireless signal generator 108 may be nested; such a navigable space may be nested in another navigable space, amounting to any number of nesting levels. For example, and without limitation, a suite or office may be nested in a floor, which may be nested in a building, which may be nested in a campus, office park, or other set of buildings, or the like. As noted above, navigable spaces may be adjacent to one another. For instance, where navigable space is a room and/or lecture hall, an adjoining room, corridor, atrium, lobby, or the like may be an adjacent navigable space. Adjacent and navigable spaces may be combined in various ways that will occur to persons skilled in the art upon reviewing the entirety of this disclosure. For instance, and without limitation, a number of adjacent rooms, and/or a number of rooms connected to a space adjacent to each room, such as a corridor, atrium, and/or lobby, may be nested and/or contained within a navigable space such as a suite and/or floor. Computing device 104 may be located in navigable space and/or may be located in a different location. For instance, and without limitation, location of wireless signal generator 108 may be same location as that of computing device 104. Navigable spaces may be nested. As used in this disclosure, "nesting" means one nesting level outside, or in other words a first navigable space is "nesting" a second navigable space where the first navigable space contains the second navigable space. Similarly, a first navigable space is "nested" in a second navigable space where the first navigable space is nested within the second navigable space. In context of a navigable space representing a subject of a sentence or paragraph, a "nested navigable space" is a navigable space nested within the instant navigable space, while a "nesting navigable space" is a navigable space in which the instant navigable space is nested.

Still referring to FIG. 1, a navigable space may include, without limitation, one or more interiors of vehicles and/or other moving and/or movable objects and/or locations, such as cars, buses, trains, subways, planes, space stations, ships, or the like. Navigable space may include, without limitation, one or more outdoor spaces, such as trails including without limitation running, hiking, biking or other trails, parks such as sports parks, recreational parks, theme parks, forests, mountains, canyons, caverns, or national parks, parking lots, transportation hubs, cemeteries, grave markers, or the like. Navigable space may alternatively or additionally include a plurality of non-contiguous sites that are commonly owned and/or managed, such as state or nationally owned historical markers, bus stops owned by a transit company or agency, street signs owned by a municipality, and/or utility connections such electric, gas, water and sewer, fire hydrants, electrical and/or light poles.

Still referring to FIG. 1, wireless signal generator 108 may be located at any suitable location. Location may include, without limitation, any fixed location as described above. Location may include, without limitation, any location at an item in navigable space as described above. As a non-limiting example, in a navigable space and/or room containing seats and/or desks, such as without limitation a stadium, classroom, lecture hall, restaurant, concert hall, or the like, a location of wireless signal generator 108 may be at one or more seats and/or desks; each of a plurality of seats and/or desks may have a wireless signal generator 108 located thereat, where plurality may be all seats and/or desks in navigable space and/or all seats and/or desks belonging to a given group, classification, or the like. In an embodiment, if a user sits at one such seat and/or desk, a first receipt of a signal from wireless signal generator 108 may prompt computing device 104 to "check in" user as located at the seat and/or desk, permitting communication with and/or data provided to computing device 104 to be modified by and/or relevant to a location at the seat and/or desk. Location may include without limitation a location along a wall, at an exit, at an entrance, at a lectern, at a blackboard, or the like. Location may include a location at a bank or panel of equipment, such as a control panel and/or control apparatus for a projector, sound system, lighting control system, or the like. Persons skilled in the art, upon reviewing the entirety of this disclosure, will be aware of various alternative or additional locations where a wireless signal generator 108 may be located within a navigable space.

With continued reference to FIG. 1, part or all of any data structure from which computing device retrieves data as described in this disclosure may be stored at portable computing device or at a remote device such as a server or the like; a relevant portion of first data structure may be downloaded as needed for future retrieval therefrom of one or more elements of data. As an illustrative example, a location where a signal is received from wireless signal generator 108 may be a place with limited or no network connection, such as a top of a mountain, a waterfall in the woods, or a location underground; when computing device 104 receives first signal, user may be at a location, such as an entryway or station having network access, where user may perform one or more steps of method the performance of which involve network connectivity as set forth in further detail below, followed by travel to root location, where data so acquired may be used to perform further steps of method. For instance, a portion or all of a data structure, and/or of data contained therein, may be downloaded to computing device 104. To further continue the illustration, reception of first signal may occur when user is at an information center or the like near to a cave, and root location may be a chamber in the cave, some distance underground, such that user may travel to the chamber, for instance as part of a tour, and then receive a description from computing device 104 concerning the chamber upon arrival. Persons skilled in the art, upon reviewing the entirety of this disclosure, will be aware of various further examples for selection of root location as consistent with descriptions provided herein.

With continued reference to FIG. 1, computing device 104 is configured to input at least a user-entered datum associated with the location identifier. User-entered datum may include any data input by a user, using any device for user input including without limitation using manual input devices such as touchscreens, keyboards, mice, touchpads, or the like, audio input devices such as microphones, which may convert speech to text to generate textual data, and/or any other device usable to input user-entered data. User-supplied data may include content data, such as text, images, video, and/or audio inputs captured using computing device 104 and/or a camera, audio input device, or the like communicatively connected to computing device 104, local and/or network-based location of text images, video files and/or streams, audio files and/or streams, or the like, for instance using uniform resource locators (URLs), file directories, or the like. User-supplied data may include contextual data, including without limitation any contextual data as described in this disclosure. Alternatively, computing device may capture a snapshot of current contextual data at the moment of capture, using user-entered data, location data, data describing user, and the like. User-entered data may be entered, without limitation, by an administrator of an organization, an individual owner and/or operator of computing device, an owner and/or operator of a remote device, or any other user. User-entered data may be entered directly and/or as a reference and/or link to a database, data structure, an element of data therein, and/or any machine-stored and/or machine-generated data and/or data location. User-entered data may be captured using at least camera, microphone, and/or other data capturing device. User-entered data may include any data including without limitation data in video and/or audio format, textual data, image data, and/or data formatted and/or stored for use in augmented reality, virtual reality, or the like.

Still referring to FIG. 1, user-entered data may include one or more elements of stylistic data. "Stylistic data," as used in this disclosure, is data dictating stylistic features of a display data structure as described in further detail below. For instance, and without limitation, where a display data structure has a visual component such as a graphical user interface, stylistic data may include fonts, font sizes, and/or text colors of textual data, background colors or images, text formatting instructions such as indentations, spacing, or the like, highlight colors, justification such as left, center, or other justification, line-spacing, rotation of text to horizontal, vertical or other angles, heading levels, bullet levels, number lists, tables, styles of hyperlinks, styles of buttons, checkboxes, or other items used as event handlers, or the like. As a further non-limiting example, where a display data structure includes an audio output component, audio stylistic data may include an initial or default volume, a mix of volume levels at different frequency ranges, one or more audio frequency filters such as high pass, low pass, bandpass, and/or other analog or digital filters, an acceptable distortion level, compression encoding and/or decoding parameters, encoding and/or decoding protocols, or the like. Stylistic data may include instructions for haptic output and/or feedback. Stylistic data may include shortcuts for user data entry such as for data entry and/or manipulation via gestures as captured optically, keystrokes, gestures on a touch-sensitive data entry device, alternative keystrokes, or the like. As an additional non-limiting example, where display data structure includes a video output component, video stylistic data may include chroma and/or luma brightness levels, overall picture brightness level, color filters, resolution, compression encoding and/or decoding parameters, encoding and/or decoding protocols, or the like. Stylistic data may include styles of calendar, dates, time fields, phone numbers, outlines, inputs to emails, bookmarks, tables of contents, templates, and/or formulas. As an additional non-limiting example, where display data structure includes one or more images, stylistic data may include chroma and/or luma brightness levels, overall picture brightness level, color filters, resolution, compression encoding and/or decoding parameters, encoding and/or decoding protocols, or the like. Stylistic data may include styles of controls for and/or abilities to perform editing functions such as deletion, copying, insertion of material, and/or moving elements. Further referring to FIG. 1, user input data may include one or more elements of position data. "Position data," as used in this disclosure, is data dictating a position and/or order of display and/or output of data in a display data structure as described in further detail below. Distinct blocks of data may be defined on a display data structure and ordered according to position data. For instance and without limitation, one or more text blocks may define blocks of textual data, one or more image blocks may define blocks of image data, one or more audio output blocks may define one or more lots of audio output data, and/or one or more video output blocks may define one or more blocks of video output data. A block may have more than one output modality; for instance, a text block may be output either as visible text or as an audio output such as a text-to-speech output, while an image may include an "alt text" datum that describes one or more elements in the image for persons who cannot view the image due to visual impairments, or because of a need to focus visually elsewhere (e.g., because a person in question is operating a vehicle or other device demanding visual attention). Position data may establish a visual order, which may be defined as an order in which blocks of data occur on a page or view of a display data structure. For instance, position data may describe an order in which tabs or other display signals as described in further detail below should appear, an order in which text, images, video windows, or the like should appear while traversing a view, or the like. Position data may alternatively or additionally establish a temporal order, where a "temporal order" is defined as an order in which data are output. For instance, position data may establish a sequence in which blocks of data are output in audio, tactile, or other forms. In an embodiment, this may enable a person who is blind or visually impaired to "look up and down" a view to become informed concerning what is available on the view in a sequence, such as a sequence from top to bottom.

Still referring to FIG. 1, position data may be provided by user implicitly and/or explicitly. As a non-limiting example of implicit input of position data, user-entered data may be input in an input order. Computing device 104 may be configured to generate position data based on input order. For instance, a temporal output order of blocks may cause the data of the blocks to be output in an order in which they were input. Spatial and/or display order of blocks may be established according to input order, for instance by setting a temporal reading order in which a user is expected to read or view visual data; temporal reading order may, as a non-limiting example, be a right-to-left reading and perusal order that proceeds down the page and wraps back to the left upon each arrival at a rightmost edge of a view; persons skilled in the art, upon reviewing the entirety of this disclosure, will be aware of various alternative and/or additional protocols for visual ordering, each of which is contemplated as being within the scope of the instant disclosure. In an embodiment, temporal order may be established by traversal in such a traversal order by an output algorithm, such as an audio and/or tactile output algorithm, of elements in a display signal and/or display data structure.

In an alternative or additional embodiment, and with continued reference to FIG. 1, position data may be received as explicit position data. For instance, and without limitation, a user may dictate and/or otherwise indicate an order in which each block should appear relative to other blocks; for instance, user may click and drag on blocks, select blocks without limitation using a locator such as a mouse or touchscreen and/or verbally and command that the block be moved relative to other blocks with a "move up one," "move down one," "move to the top," "move to the bottom," or other command, to alter relative positions of blocks. In some embodiments, above-described features may provide users with a flexible way to create a series of blocks or pieces to create a "document" including headings, images, text, audio clips or the like.

Still referring to FIG. 1, user-entered data, and/or other items, such as display signals and/or data records, generated therewith or therefrom and/or associated therewith, may be associated with location identifier, and/or with one or more additional location identifiers. Additional location identifiers may be associated with user-entered data, and/or other items, such as display signals and/or data records, generated therewith or therefrom and/or associated therewith by user-entered data, such as an input directly identifying an additional location identifier, an input establishing a relationship between location identifiers as described above, and/or an input identifying other data structures such as other user-entered data, and/or other items, such as display signals and/or data records, generated therewith or therefrom and/or associated therewith, which are in turn associated with additional location identifier or identifiers. For instance, where user incorporates a first user-entered datum, and/or other items, such as display signals and/or data records, generated therewith or therefrom and/or associated therewith, in a second user-entered datum, and/or other items, such as display signals and/or data records, generated therewith or therefrom and/or associated therewith, any location, one or more location identifiers associated with first user-entered datum, and/or other items, such as display signals and/or data records, generated therewith or therefrom and/or associated therewith may be associated with second user-entered datum, and/or other items, such as display signals and/or data records, generated therewith or therefrom and/or associated therewith; a user may be able to remove and/or add any associations by further user input. Where location is and/or is associated with a group identifier and/or has any other relationship with other location identifiers and/or wireless signal generators, any such relationships may further relate user-entered data, and/or other items, such as display signals and/or data records, generated therewith or therefrom and/or associated therewith to such additional location identifiers and/or wireless signal generators.

Still referring to FIG. 1, computing device 104 is configured to instantiate a display data structure 124 as a function of the at least a user-entered datum. A "display data structure," as used in this description, is a data structure that instructs a user interfacing component, for instance as described in further detail below, to output one or more display signals. For instance, a display data structure 124 may include a graphical user interface (GUI), a voice user interface (VUI), a tangible or tactile user interface, or the like. Display data structure 124 includes a plurality of display signal. A "display signal," as used herein, is a set of data to be displayed at a user output component. A display signal may include instructions for display of data. Non-limiting examples of display signals 128*a-n* may include "tabs," "views," windows, or the like. Display data structure 124 may be instantiated using one or more objects, memory locations and/or functions, using any suitable format, including, as a non-limiting example, Java server pages (jsps), a PHP: hypertext processor (PHP) page, an HTML page, or a collection of multiple such pages for web development, one or more graphics programs and/or data for a native application, or the like.

With continued reference to FIG. 1, each display signal of plurality of display signals 128*a-n* may include a subset of the plurality of categories of data, as described above. In an embodiment, and as a non-limiting example, each subset of plurality of display signals 128*a-n* may differ from each other subset of the plurality of display signals 128*a-n*; in other words, each display signal may contain, for each other display signal, at least one element of data not present on the other display signal. Plurality of display signals 128*a-n* may include, without limitation, a data signal for each group of a plurality of groupings of categories. As a non-limiting example, plurality of display signals 128*a-n* may include a display signal for map display and/or exploration. Plurality of display signals 128*a-n* may include a display signal for navigation instructions, which may include without limitation instructions that have accessibility info.

Still referring to FIG. 1, categories of data may include groupings of data by navigable space; for instance, first a category may include data describing contents of navigable space containing first transmitter, such as locations of objects such as architectural and/or user features within the navigable space and/or other information regarding the navigable space, while a second category may include data describing contents of an adjacent navigable space and/or a navigable space in which the navigable space containing the first transmitter is nested. Categories of data may include groupings of data according to functions of elements described, such as without limitation a grouping of data describing electrical systems such as wiring, outlets, lighting, lighting controls, computer controls, audio equipment, speakers, banks of speakers or lights, or the like, a grouping of data describing plumbing systems such as pipes, sinks, toilets, fountains, plumbing fixtures, or the like, a grouping of data describing accessibility features such as accommodations for wheelchairs, accommodations for sensory impairment such as without limitation visual or hearing impairment, or the like, groupings of data according to map information such as exits, passages such as corridors between navigable spaces, passages or paths between buildings, ways to change levels or floors (e.g. stairs, elevators, ramps, and the like), groupings of data according to category of usage, such as data differentiating between dining areas, retail spaces, restrooms, classrooms, entertainment centers, performance centers, laboratories, practice rooms, and the like, groupings of data including service information and/or contact links, such as may be used to peruse service and/or product offerings such as menus or the like and/or to order such products and/or services groupings of data according to path information such as navigation instructions as described above, groupings of data according to usage instructions as described above, groupings of data according to temporal information, such as a schedule for use of a navigable space and/or spaces, including without limitation class schedules, lecture schedules, games, concerts, reservations of rooms, seats, and the like, groupings of data according to emergency information, such as emergency exits, emergency procedures such as evacuation procedures, emergency equipment, or the like. Data may include safety data, such as descriptions of evacuation routes, emergency exits, locations of fire alarms, defibrillators, fire extinguishers, fire doors, or the like.

With continued reference to FIG. 1, categories may include intersections or combinations of groupings of data. Categories may include, as a non-limiting example a first category for locations of objects such as architectural and/or user features in navigable space containing first transmitter and one or more second categories for locations of objects such as architectural and/or user features in an adjacent, nesting, or nested navigable space. Categories may include, as another non-limiting example, a first category for grouping of data describing electrical systems such as wiring, outlets, lighting, lighting controls, computer controls, audio equipment, speakers, banks of speakers or lights, or the like in navigable space containing first transmitter and one or more second categories for groupings of data describing electrical systems such as wiring, outlets, lighting, lighting controls, computer controls, audio equipment, speakers, banks of speakers or lights, or the like in an adjacent, nesting, or nested navigable space. Categories may include, as another non-limiting example, a first category for grouping of data describing plumbing systems such as pipes, sinks, toilets, fountains, plumbing fixtures, or the like in navigable space containing first transmitter and one or more second categories for groupings of data describing electrical systems such as wiring, outlets, lighting, lighting controls, computer controls, audio equipment, speakers, banks of speakers or lights, or the like in an adjacent, nesting, or nested navigable space. Categories may include, as another non-limiting example, a first category for a grouping of data describing plumbing systems such as pipes, sinks, toilets, fountains, plumbing fixtures, or the like in navigable space containing first transmitter and one or more second categories for groupings of data describing plumbing systems such as pipes, sinks, toilets, fountains, plumbing fixtures, or the like in an adjacent, nesting, or nested navigable space.

Still referring to FIG. 1, categories may include, as another non-limiting example, a first category for a grouping of data describing accessibility features such as accommodations for wheelchairs, accommodations for sensory impairment such as without limitation visual or hearing impairment, or the like in navigable space containing first transmitter and one or more second categories for groupings of data describing accessibility features such as accommodations for wheelchairs, accommodations for sensory impairment such as without limitation visual or hearing impairment, or the like in an adjacent, nesting, or nested navigable space. Categories may include, as another non-limiting example, a first category for a grouping of data according to map information such as exits, passages such as corridors between navigable spaces, passages or paths between buildings, ways to change levels or floors (e.g. stairs, elevators, ramps, and the like) in navigable space containing first transmitter and one or more second categories for groupings of data according to map information such as exits, passages such as corridors between navigable spaces, passages or paths between buildings, ways to change levels or floors (e.g. stairs, elevators, ramps, and the like) in an adjacent, nesting, or nested navigable space. Categories may include, as another non-limiting example, a first category for a grouping of data according to category of usage, such as data differentiating between dining areas, retail spaces, restrooms, classrooms, entertainment centers, performance centers, laboratories, practice rooms, or the like in navigable space containing first transmitter and one or more second categories for groupings of data according to category of usage, such as data differentiating between dining areas, retail spaces, restrooms, classrooms, entertainment centers, performance centers, laboratories, practice rooms, or the like in an adjacent, nesting, or nested navigable space. Categories may include, as another non-limiting example, a first category for service information and/or contact links, such as may be used to peruse service and/or product offerings such as menus or the like and/or to order such products and/or services in navigable space containing first transmitter and one or more second categories for service information and/or contact links, such as may be used to peruse service and/or product offerings such as menus or the like and/or to order such products and/or services in an adjacent, nesting, or nested navigable space.

With continued reference to FIG. 1, categories may include, as another non-limiting example, a first category for a grouping of data according to path information such as navigation instructions as described above in navigable space containing first transmitter and one or more second categories for groupings of data according to path information such as navigation instructions as described above in an adjacent, nesting, or nested navigable space. Categories may include, as another non-limiting example, a first category for a grouping of data according to usage instructions as described above, groupings of data according to temporal information, such as a schedule for use of a navigable space and/or spaces, including without limitation class schedules, lecture schedules, games, concerts, reservations of rooms, seats, and the like in navigable space containing first transmitter and one or more second categories for groupings of data according to usage instructions as described above, groupings of data according to temporal information, such as a schedule for use of a navigable space and/or spaces, including without limitation class schedules, lecture schedules, games, concerts, reservations of rooms, seats, and the like in an adjacent, nesting, or nested navigable space. Items may include items stored on site, such as inventory, hazardous materials, construction materials while under construction, traveling exhibits, employees, patients, visitors, livestock, plants, rented items and rented from or to who. Items may include work assignments of employees and/or contractors. Items may include schedules of conferences, room equipment layout, bus or train schedules. Categories may include, as another non-limiting example, a first category for a grouping of data according to emergency information, such as emergency exits, emergency procedures such as evacuation procedures, emergency equipment, or the like in navigable space containing first transmitter and one or more second categories for groupings of data according to emergency information, such as emergency exits, emergency procedures such as evacuation procedures, emergency equipment, or the like in an adjacent, nesting, or nested navigable space. Categories may further include any combination of intersections of groupings as described above, such as without limitation accessibility, wiring, plumbing, path, or other information for all rooms on a floor or in a building, or the like.

Still referring to FIG. 1, plurality of display signals 128*a-n* may include a display signal for each grouping of a plurality of groupings of categories; a non-limiting example of such groupings may include, without limitation, a grouping of categories relating to accessibility, such as accessibility in a current space, accessibility in an adjacent space, accessibility in a nesting space such as a floor building, campus or the like, accessibility in a nested space, or the like. Another display signal may include, without limitation, a display signal for map display, in which any map, as described above, of navigable space containing first transmitter, nesting navigable spaces, and/or nested navigable spaces, may be displayed; map may, for instance permit panning, rotating, and/or zooming to view two-dimensional and/or three-dimensional map data of current, nested, and/or nesting spaces, such as ability to view current navigable space, to zoom in to see a nested navigable space, and/or zoom out to view a nesting navigable space. As a further non-limiting example, a display signal of plurality of display signals 128*a-n* may include a display signal for receiving user inputs requesting navigation instructions and/or displaying navigation instructions; generation and/or display of navigation instructions may be performed according to any embodiments therefor disclosed in U.S. Nonprovisional application Ser. No. 16/247,547. As another non-limiting example, a data signal of plurality of data signals may be dedicated to usage instructions, including display of generated usage instructions and/or user inputs requesting usage instructions; generation and/or display of usage instruction may be performed according to any embodiment therefor described in U.S. Nonprovisional application Ser. No. 16/247,547. Another non-limiting example of a display signal of plurality of display signals 128*a-n* may include a display signal displaying schedule data within a current navigable space, a nested navigable space, and/or a nesting navigable space, such as without limitation class schedules, game schedules, performance schedules, or the like. As a further example, a display signal of plurality of display signals 128*a-n* may include a display signal that provides safety information concerning a current space, nesting space, and/or nested space. In another non-limiting example a display signal of plurality of display signals 128*a-n* may display floor change information, such as how and where to get from a building floor containing current navigable space to a different building floor. As an additional non-limiting example, a display signal of plurality of display signals 128*a-n* may provide information describing contents, seating, and/or layout of current navigable space, a nested navigable space, and/or a nesting navigable space. Plurality of display signals 128*a-n* may include a display signal for viewing and/or requesting products and/or services, such as room service at a hotel, menu items at a restaurant, bar, or café, concessions at a ballpark, or the like. Plurality of display signals 128*a-n* may include a display signal at which a user can ask and/or submit questions, submitting quiz responses, perform classwork, submit exam answers, or the like.

In an embodiment, and still referring to FIG. 1, contents of one or more display signals 128*a-n* may depend on contextual information as described above; data included in any display signal may be filtered and/or selected based on any contextual datum and/or data. For instance, and without limitation, a display signal for displaying maps may contain details of maps selected and/or filtered by contextual data such as without limitation user group data; as a non-limiting example, a map of a current, nested, and/or nesting navigable space may include wiring map information for a user having group association indicative that the user is an electrician, plumbing information for a user having group association indicative that the user is a plumber, maintenance access information for a user having group association indicative that the user is a repair worker, or excluding any of the above for users not belonging to the above groups. As a further non-limiting example, data provided in a display signal for displaying schedules may be filtered and/or selected according to one or more elements of user and/or user group information, such as listing classes, performances, games, and/or reservations at which user is expect and/or authorized to attend, or the like. As an additional non-limiting example, data provided in a display signal for displaying navigational sequences may be filtered and/or selected according to one or more elements of user and/or user group information, such as, without limitation a user's accessibility needs; for instance, a wheelchair-bound user may be provided wheelchair-accessible navigation instructions or the like.

As a further non-limiting example, and still referring to FIG. 1, data provided in a display signal for displaying emergency instructions and/or information may depend on a current emergency status and/or risk level; for instance, a degree of current risk of fire, terrorism, criminal activity, or the like, a current event with potential local consequences such a flood watch, tornado watch, and/or tornado warning, and/or an alert to a current emergency situation such as an active shooter, fire, flood, storm or the like with instructions for how to respond may be displayed. Emergency display signal may alternatively or additionally depend on user group information, such as without limitation a first set of instructions and/or information for users who are students or other members of a civilian population, a second set of instructions and/or information for law enforcement and/or security personnel, a third set of instructions and/or information for firefighters, a fourth set of instructions and/or information for medical first responders, or the like. As another non-limiting example, data provided by or via a safety-related display signal may depend on user information; such user information may include particular vulnerabilities and/or existing health conditions of a user, such as prominent display of defibrillation stations for users tending to fibrillation, information concerning allergens and/or irritants that data suggests affect a particular user, or the like. Such user information may include accessibility information for users with disabilities such as movement impairment and/or visual impairment; evacuation routes and/or instructions for operation of safety equipment and/or facilities may depend, for instance, on what means are at a user's disposal to navigate through a navigable space, for instance as described in U.S. Nonprovisional application Ser. No. 16/247,547, and/or what routes, such as ramps and/or elevators versus stairs, routes with bannisters, or the like, support a user's mobility needs. Each of the above differences and/or modifications in display signal data may be accomplished by retrieval thereof from datastores and/or data structures according to contextual data as described above.

A "contextual datum" as used in this disclosure is any element of data, excepting location identifier, usable to select a subset of location-specific data. A contextual datum may include, without limitation, data describing a user. For instance, and without limitation, data describing a user may indicate whether a user is permitted to receive information describing how to operate and/or repair equipment. User access privileges, rights, and/or restrictions may be determined by determining user membership in one or more groups according to group information provided in a user profile, such as user membership in a military organization, user membership in a company or factory, a user position or rank, or the like. Group information may be information concerning a group of users related by a particular interest or other commonality. Data describing a user may, as an additional non-limiting example, specify a default user medical need, such as, without limitation, a user with a heart condition having a default medical need relating to treatment of arrhythmia, cardiac arrest, or the like. Any data entered or contained in system 100 with respect to and/or linked to unique identifier and/or any transmitter may be associated with one or more access levels or controls, including without limitation data limited to only a single user, data available only to a group of users, and/or data available to any user operating system 100 and/or any device or component included within system. Thus, for instance, a first user operating a computing device 104 as disclosed herein may be presented with a first set of information linked to at least a first transmitter, while a second user may be presented with a second set of information; first set may differ from second set, for instance and without limitation by exclusion from second set of private and/or group-related information linked to first user and not second user, and/or by inclusion of private and/or group-related information linked to second user and not first user. Further continuing the example, first set and second set may have in common data that is publicly available and/or data linked to a group in which both first user and second user are members. Contextual data may include historical contextual data, which may include any historical data about location and/or items therein, such as without limitation data describing, people, items, events, construction, additions, or the like. Contextual data may include any contextual and/or regional descriptive data as described in this disclosure.

In some embodiments, and still referring to FIG. 1, contextual data may include one or more elements of circumstantial data. As used in this disclosure, "circumstantial data" is any data, excluding user location or a user entered request, describing circumstances affecting, and/or a current condition of the user, of items, including objects and/or living organisms, within spatial bounding constraint, and/or a space overlapping spatial bounding constraint. Circumstantial data may include without limitation a personal schedule, space and/or room schedule status, or other current schedule detail. As a further non-limiting example, circumstantial data may include data describing history of user interactions with system; such history of user interactions may be used to predict a likely current and/or future user interaction. Circumstantial data may include a user orientation which may, for instance, be determined as described above. Circumstantial data may include a recent direction of user travel; recent direction of user travel may be determined in any way described in this disclosure, including without limitation by determining an order of interaction with transmitters as described herein, a navigational sequence and/or set of instructions user of computing device 104 is following and/or has recently followed. Circumstantial data may include a current occupancy within the spatial bounding constraint, such as without limitation one or more patients, students, instructors, technicians, or other persons who are within a space that overlaps spatial bounding constraint. As a non-limiting example, an NFC tag or beacon in/at a medical exam room and/or or hospital room to get information about a patient, doctor, staff, or ailment of the patient in that room; in an embodiment, similar occupancy data may be included regarding nursing homes, assisted living, group homes, rooms therein, or the like. As a further non-limiting example, circumstantial data may include a role-based association with the spatial bounding constraint, such as an assignment of a shift, floor, room, or the like associated with spatial bounding constraint to a medical professional, worker, technician, professor, lecturer, laboratory director and/or technician, researcher, or the like. Role-based data may include data provided to emergency responders arriving in and/or responding to emergencies within an area overlapping spatial boundary constraint, for instance as described in further detail below. Role-based data may be controlled according to user authorization as described above; for instance, medical data such as patient history, current treatment regimen, or the like may be provided only to a user whose role-based data indicates to be a medical professional, and whose logon or authorization data indicates is authorized to view the medical data.

Still referring to FIG. 1, one or more elements of data used in methods described in this disclosure may be generated and/or retrieved as a function of one or more elements of circumstantial data. For instance, and without limitation, spatial bounding constraint may be established as a function of circumstantial data; as an example, a spatial bounding constraint may be established as a floor, room, and/or other region to which a user of portable device is assigned, as a set of trails rooms, and/or areas included in a tour or sequence of locations for the user to visit, or the like. For instance, and without limitation, a user role indicating electrician or plumber may translate to spatial bounding constraint encompassing a whole building or section thereof, permitting information to be provided concerning pipes or wires running to or from a room containing first transmitter. A professor scheduled to perform a lecture within a given lecture room may be provided a spatial bounding constraint limited to that room, which may further be provided even if the professor is in a different room and/or corridor of a building containing the lecture room. As a further non-limiting example, a user who is moving rapidly as detected by a rate of interactions with transmitters, an IMU or other motion sensor of portable computing device, or the like, may be provided a spatial bounding constraint that is larger, or that contains a lengthier projected future user path, than a spatial bounding constraint provided to a slower-moving user. As an additional non-limiting example, a user whose role data and/or authorization data indicates that the user is allowed to access maintenance shafts, engine rooms, or other role-specific and/or authorization-specific areas may receive a spatial bounding constraint including such areas, while a user lacking such role and/or authorization data may be provided a spatial bounding constraint excluding such areas.

Circumstantial data may, in a non-limiting example, limit information provided to user according to a category, schedule, need, or the like of user. For instance, and without limitation, user may have a schedule indicating that a space, such as without limitation a room or other area overlapping spatial bounding constraint, is a location for a class, presentation, tour, or the like in which user is enrolled, for which user is an instructor or presenter, or the like. Where user has a particular role, such as an electrician, plumber, doctor, and/or other specialized role, local area description may provide user with information pertaining to that role; for instance, patient medical history and/or other patient facts may be provided only to a doctor and/or nurse, based for example on logon information. One or more elements of local area description may alternatively or additionally include accessibility information matched, for instance, to a user profile including user accessibility needs.

Still referring to FIG. 1, generating a display data structure may include detecting an emergency and generating the local area description as a function of the emergency; in other words, circumstantial data may include a detection of an emergency, a description of an emergency, and/or other data concerning an emergency, which may be referred to herein collectively as "emergency data." Emergency data may include, without limitation, a type of an emergency; for instance, emergency data may identify an emergency within and/or potentially affecting an area overlapping spatial bounding constraint, including emergencies and/or causes thereof originating and/or currently outside such an area, as a fire, flood, electrical problem, release of toxins and/or radioactive material, release of pathogens, an attack and/or threatened attack by a malefactor such as without limitation a terrorist and/or active shooter, a bomb threat, an escaped animal, an explosion, an earthquake, a volcanic eruption, a medical emergency such as a heart attack and/or stroke, a drowning or any other emergency that may occur to a person skilled in the art, upon reviewing the entirety of this disclosure.

Still referring to FIG. 1, emergency data may include a location of an emergency. Location of emergency may be determined by system and/or any device incorporated in and/or in communication with system because of interaction with one or more sensors such as without limitation sensors incorporated in alarm systems or the like; sensors may be installed in building and, for instance, connected to a wired or wireless networks as described in this disclosure. Sensors may be integrated in one or more users' portable computing devices; for instance, heat sensors may detect fire, one or more motion sensors may detect seismic activity, or the like. Alternatively or additionally, location of an emergency may be received as a result of interaction between portable computing devices, remote devices, and/or transmitters as described above. For instance, and without limitation, a user may report seeing emergency, such as a fire, smoke, an active shooter or other security threat, or the like, and system may determine user location and/or portable computing device location as a result of interaction with a transmitter and/or other methods as described above. Alternatively or additionally, where a user has been identified as an originator of and/or participant in a security threat, system may determine that the user has passed within range of one or more transmitters, and may determine a location and/or direction of travel of the user as a result.

Still referring to FIG. 1, data describing a user may be retrieved using a user identifier, which may be retrieved from memory of computing device 104 and/or another device in system 100. Retrieving user identifier may include retrieving an identifier unique to user; alternatively or additionally, retrieving user identifier may include retrieving one or more group identifiers linked to user identifier, where the group identifiers may, without limitation, identify groups of user identifiers having common interests, common needs for assistance or accommodation, or access privileges. For instance, may at least a group identifier may identify a group of users that are affiliated with an institution, company, business, or club, a group of users with a certain degree of visual or mobility impairment, or the like; each user identifier may be associated with one or many groups and/or group identifiers. Any group identifier may have any structure or contents suitable for use as a user identifier, and may be produced, generated, or received according to any process or using any device or module suitable for production, generation, or reception of a user identifier. Groups may be organized according to any common need for accommodation and/or class of impairment; for instance, a first group may be linked to visual impairment and concomitant need for usage instructions that do not rely on sight for performance, while a second group may be linked to a physical impairment such as lowered mobility or dexterity, such that usage instructions assume use of, for instance, tools to aid with reach, grip, or the like. Groups may include at least a group identified by a common interest, such as a hobby or profession; thus if user belongs to a group of mechanics, and item includes a device or element that may be repaired by a mechanic, usage instruction may be generated using stored steps or step sequences describing processes for repair or modification of item by a mechanic. Data describing a user may include an identifier of a user of computing device 104, a name, address, electronic mail address, account number, username, phone number, or other identifying and/or contact information of a user, one or more groups in which user is a member, and/or one or more accessibility needs the user is recorded as having.

Still referring to FIG. 1, contextual data may include, without limitation, a current time, a schedule status such as without limitation whether a class, game, performance or the like is about to start or is in session, whether a given venue such as restaurant, laboratory, classroom, or the like is open, what menu at a restaurant is available, or the like, a reservation status, such as whether a navigable space or a resource therein is reserved, an emergency status, or any other example that may be described in this disclosure or may occur to persons skilled in the art. Contextual data may include one or more user-entered instructions. A user instruction may include a user instruction selecting user feature, where a "user feature" is at least an object located in navigable space for the purpose of user interaction; for instance, user features may include without limitation sinks, toilets, toilet stalls, urinals, paper towel dispensers, hand driers, trash cans, automatic teller dispensers, doors, elevators, vending machines, fountain drink dispensers, ticket taking/dispensing devices, salad bars, or any other items a user would expect to interact with when using navigable space. A user feature may include a free-standing device. For example, and without limitation, identifying the second location may involve receiving a user instruction, selecting an identification of a user feature from a plurality of identifications of user features as a function of the user instruction, and identifying a location in a map using the identification of the user feature; identification of user feature may be stored, for instance, in first data structure, such as in another node of the type containing identifiers of transmitters, or in a node of a distinct type within the same tree or other data structure. In one embodiment, the user instruction may contain the identification of the user feature; for instance, a list of features in navigable space may be presented to the user, for instance as a "drop-down menu" or an equivalent provided by audio means. User may select, via an input device of user output component or portable computing device, an item from that list; list may correspond to an enumeration of items linked to identifiers.

Still referring to FIG. 1, portable computing device may select the identification of the user feature by determining an identification of a category of user feature as a function of the user instruction, identifying at least an identification of a user feature of the plurality of identifications of user features, the at least an identification matching the category, and selecting the identification of the user feature from the at least an identification. For instance, user instruction may specify the category of user feature. As a non-limiting example, a set or list of categories of features may be presented to the user, from which the user selects a desired category; the set or list may be presented similarly to the set or list of user features in navigable space. The set or list may be restricted to categories available in navigable space. Alternatively or additionally, user may say or enter a word or phrase that is linked to a user category in a data structure such as lookup table. The user instruction may indicate a desired action, and the portable computing device may identify the category using the desired action; in an embodiment, this may be performed by matching the desired action to one or more categories of features based on a data structure linking actions to features.

One or more contextual data may include, without limitation, one or more elements of user history, such as without limitation past user actions, commands, and/or selections in system 100 and/or entered on computing device 104, either in general or per contextual datum such as time, place, schedule, or the like. One or more elements of contextual data may include a user goal, which may be determined, without limitation, as described in U.S. Nonprovisional application Ser. No. 16/247,547.

Still referring to FIG. 1, contextual data may include, without limitation, a current time, a schedule status such as without limitation whether a class, game, performance or the like is about to start or is in session, whether a given venue such as restaurant, laboratory, classroom, or the like is open, what menu at a restaurant is available, or the like, a reservation status, such as whether a navigable space or a resource therein is reserved, an emergency status, or any other example that may be described in this disclosure or may occur to persons skilled in the art. Contextual data may include one or more user-entered instructions, such as user-entered instructions as described in U.S. Nonprovisional application Ser. No. 16/247,547, filed on Jan. 1, 2019, and entitled "DEVICES SYSTEMS, AND METHODS FOR NAVIGATION AND USAGE GUIDANCE IN A NAVIGABLE SPACE USING WIRELESS COMMUNICATION," the entirety of which is incorporate herein by reference. One or more contextual data may include, without limitation, one or more elements of user history, such as without limitation past user actions, commands, and/or selections in system 100 and/or entered on computing device 104, either in general or per contextual datum such as time, place, schedule, or the like. One or more elements of contextual data may include a user goal, which may be determined, without limitation, as described in U.S. Nonprovisional application Ser. No. 16/247,547.

With further reference to FIG. 1, one or more data may include safety data. "Safety data," as used in this disclosure, is data describing objects and/or facilities located at, within, or adjacent to an area defined by and/or overlapping spatial bounding constraint, and/or use thereof, affecting, protecting and/or improving safety of persons at, within, or near to an area defined by and/or overlapping spatial bounding constraint. Safety data may include identification of organizations, groups, and/or individuals responsible and/or available for provision of safety and/or emergency assistance in an area overlapping spatial bounding constraint, such as police departments, fire departments, local institutional and/or private security, lifeguards, medical technicians such as without limitation emergency medical technicians (EMTs), medical professionals, or the like. Safety data may include procedures and/or protocols to be used to preserve safety and/or to respond to emergencies, such as without limitation procedures to perform in case of a fire or fire alarm, if a person is caught in a riptide, in case of inclement weather, in case of a release of toxic and/or radioactive material, in response to bomb threats and/or detonations, in response to active shooter scenarios, in case of escaped animals and/or wildlife-related threats, or the like. Procedures and/or protocols may alternatively or additionally include instructions for contacting and/or alerting to an emergency and/or safety-related problem organizations, groups, and/or individuals responsible and/or available for provision of safety and/or emergency assistance in an area overlapping spatial bounding constraint; such instructions may include contact information and/or helplines to such organizations, groups, and/or individuals. Procedures and/or protocols may include instructions for identifying and/or alerting organizations, groups, and/or individuals responsible and/or available for provision of safety and/or emergency assistance in an area overlapping spatial bounding constraint regarding pregnancy, illness, bullying, perceived security threats or other hazards, and/or any other phenomenon potentially affecting safety and/or involving an emergency. Procedures and/or protocols may be received from and/or generated by organizations, groups, and/or individuals responsible and/or available for provision of safety and/or emergency assistance in an area overlapping spatial bounding constraint.

Still referring to FIG. 1, as a non-limiting example, safety data may include construction methods and/or materials of structures and/or objects within and/or overlapping spatial bounding constraint, including without limitation fire rating, type of structure such as wood structures for floors, c thru h, basement, attic, and/or canopies, combustible materials on walls, ceilings, floors, anti-seismic properties and/or properties, or the like. Safety information may include locations of system controls such as, without limitation, controls for elevators, fire door closures, alarms, sprinkler systems, video systems, audio systems, electrical panels such as without limitation circuit breaker, or the like. Safety information may include locations and types of hazardous materials within and/or near to an area overlapping spatial bounding constraint. Safety information may include locations and/or other data concerning safety zones within and/or near to an area overlapping spatial bounding constraint. Safety information may include location and/or status of emergency and/or care equipment, including fire extinguishers, defibrillators, emergency medications such as without limitation epinephrine, anti-seizure medication, insulin, anticoagulants, paralytics, and the like, emergency medical supplies such as without limitation surgical equipment, bodily fluids such as blood and/or plasma, platelets, albumin, tourniquets, transport equipment, oxygen delivery systems and supplies, pain-management supplies, anesthetics, intubation equipment, intravenous equipment, and/or communication lines or the like to call for emergency assistance, emergency codes. Safety data may include any data identifying emergencies and/or emergency alarms or notifications. Safety data may include any data concerning and/or indicating how to respond in cases of emergencies. Safety data may be provided to emergency responders arriving in and/or responding to emergencies within an area overlapping spatial boundary constraint.

Continuing to refer to FIG. 1, contextual data and/or other data may include regional descriptive data. Regional descriptive data may include personal data of a person within spatial bounding constraint, within an area overlapping spatial bounding constraint, and/or otherwise linked to spatial bounding constraint. Person within area overlapping spatial bounding constraint may include, without limitation, a student, instructor, provider of medical care, medical patient, repair or equipment maintenance professional, and/or any other person who may be located in such an area as determined by system, for instance and without limitation by interacting with system using a portable computing device as described in this disclosure. Such personal data may include an identifier of a person, a name, a professional identification number, a profession, a rank, and/or any other data concerning the person. For example, and without limitation, where spatial bounding constraint contains and/or defines a hospital and/or medical examination room, regional descriptive data may include a patient identifier of a patient that is currently in the room and/or with data relevant to the patient that is in the exam or hospital room; such data may include, without limitation, a patient's medical history data, information on current ailment, current treatment processes and/or regimens, current medications, allergies and/or other sensitivities of note, or the like. Regional descriptive data may include legal information, such as power of medical attorney, power of financial attorney, wills, advance directives, "living wills," or the like. Personal data may include organizational role data, defined for this purpose as data describing a role, position, and/or set of responsibilities, duties, and/or privileges a person within and/or otherwise connected to spatial bounding constraint possesses. Personal data may include credential data such as without limitation professional licenses, certifications, job titles, or the like. As a non-limiting example, where spatial bounding constraint contains, is contained in, and/or overlaps a medical facility such as a hospital, clinic, long-term care facility, or the like, regional descriptive data may identify a doctor, nurse, medical technician, and/or other staff member assigned to a room, patient, patient family, patient friends, station, and/or floor overlapping spatial bounding constraint, as well as professional history, education, awards, specialties, recognitions, or other information of such doctor, nurse, medical technician, and/or other staff member. Circumstantial data, as described in further detail below, may be used to determine whether portable computing device, and/or a user thereof, is authorized to receive, store, decrypt, and/or output one or more elements of regional descriptive data, including without limitation personal and/or medical data, for instance to comply with privacy regulations governing one or more categories of data.

Further referring to FIG. 1, regional descriptive data may include data identifying and/or describing one or more living organisms in an area overlapping spatial boundary constraint. For instance, and without limitation, regional descriptive data may identify one or more animals, such as animals in zoos, aquariums, pet hospitals, boarding facilities, pet stores, farms, ranches, nature preserves, lakes, oceans, and/or in the air near to and/or at spatial bounding constraint. Animals may include any animals from any phylum. Regional descriptive data may describe, without limitation, any prokaryotic and/or eukaryotic single-celled organisms and/or colonies, including without limitation protozoa, algae, amoebas, bacteria, archaea, or the like. Regional descriptive data may include descriptions of diseases and/or pathogens, including bacteria, viruses, pathogenic fungi, pathogenic prions, and/or parasites. Regional descriptive data may describe and/or identify one or more plants, such as indoor and/or outdoor trees, shrubs, herbs, vines, mosses, ferns or the like. Regional descriptive data may describe and/or identify one or more fungi and/or fungal fruiting bodies such as mushrooms. Regional descriptive data may include instructions for care and/or propagation of living organisms, including watering, feeding, sunlight needed, habitat requirements such as soil or other grown media, temperature requirements, symbiotic and/or otherwise beneficial relationships with other organisms such as bees, or the like. Regional descriptive data may include safety information pertaining to living organisms such as information relating to toxins such as poison and/or venom, allergies, behavior such as predatory and/or territorial behavior, danger of falling branches and/or fruiting bodies, or the like.

Still referring to FIG. 1, regional descriptive data may include construction history of a structure, such as without limitation a building, overlapping spatial bounding constraint. Construction history may include without limitation construction methods, additions, builders, architects, engineers, donors, historical events, or the like. Regional descriptive data may include a function of a space, such as without limitation a room, overlapping spatial bounding constraint; examples may include, without limitation, a purpose of a hospital room, medical room, laboratory, lecture room, or the like. Regional descriptive data include a description and/or status of equipment located within spatial bounding constraint; for instance, and without limitation, regional descriptive data may include equipment in a hospital room, status of equipment in hospital room, or the like. As a further non-limiting example, where spatial bounding constraint overlaps a classroom and/or lecture room, regional descriptive data may include data identifying and/or describing a status of lecture equipment, audiovisual equipment, or the like. Regional descriptive data may include a current and/or scheduled room and/or space configuration, including without limitation a current and/or scheduled configuration of partitions, seating, lecterns, equipment, or the like. Regional descriptive data may include schedule information such as a class schedule, a schedule of equipment use and/or procedures to be performed in hospital room, or the like. Regional descriptive data may include exhibit and/or touring information such as information pertaining to history and/or contents of art exhibits, science exhibits, other museum exhibits, exhibits in zoos and/or aquariums, stations along historical and/or nature trails, or the like. Regional descriptive data may include historical data relating to an object within spatial bounding constraint and/or within an area overlapping spatial bounding constraint. Regional descriptive data may include current reservation data of a space, room, object, and/or piece of equipment such as without limitation a hotel room. Regional descriptive data may include bus and/or train timetables or other schedule information.

Regional descriptive data may include one or more elements of data describing performances, athletic contests, or artistic endeavors, such as without limitation times, durations, participants, and/or contents of plays, operas, symphonies, contests of team sports such as basketball, football, soccer, cricket, or rugby matches, rodeos, races, or the like. Information may include cast, players, directors, set designers, musicians, docents, financial supporters, conductors, teams, officials, coaching staff, owners, support organizations, cheerleaders, organizers, artists, or the like. Information may include data such as without limitation sporting statistics for a game, season and/or lifetime of a player, curriculum vitae or other biographical and/or professional information concerning performers and/or other persons, or the like. Information may include data concerning a stadium, auditorium, amphitheater, or other performance space overlapping spatial bounding constraint.

Still referring to FIG. 1, contextual data includes an element of reference data. Reference data may be obtained through a user-entered datum. Reference data may be user-entered data associated with a location identifier. Reference data may only be modified or created by entities and/or persons with authorization. For example, rights to change or create reference data may be held by an owner of a wireless signal generator 108 and/or transmitter. In another nonlimiting example, reference data may be data external to the system 100. For example, reference data may be a link, such as a hyperlink, to an external data source, like a webpage. "Reference data," as used herein, is any type of field or groups of fields containing data and formatting, including layout and segmentation, which can be referenced by other fields, wireless signal generators such as a transmitter, and the like. Reference data may be any type of contextual data, user-entered data, and/or location specific data as discussed in this disclosure. A "field," as used herein, refers to a data field where data is stored. Types of fields are described in further detail in FIG. 2A. Any field or groups of fields referencing reference data may be established as an instance of that data such that the modification of reference data in one location will modify reference data in all locations that the data is referenced. Reference data may point to the retrieval of a specific set of location specific data. For example, reference data may be a link to a specific set of location specific data. Reference data may be a link, such as a hyperlink, which refers to a localized data record of another transmitter and/or wireless signal generator 108. Additionally or alternative, reference data may be the data set that is referenced. In a nonlimiting example, in the instance that system 100 is used in an art museum wherein wireless signal generators are located at each art piece, reference data may be a set of data that describes the artist of the art pieces. Continuing the example, reference data may be populated in each localized data record associated with each wireless signal generator. Reference data may be included with the location specific data in the display data structure of the localized data record.

Still referring to FIG. 1, reference data may be configured to be associated with a location identifier. In an embodiment, reference data may be associated with a particular navigable space, wherein the navigable space may contain several wireless signal generators. Continuing the previous example, reference data may be associated with all wireless signal generators within nesting navigable space such as a room in an art museum. Each wireless signal generator 108 within the nesting navigable space may have a unique identifier in a nested navigable space within the nesting navigable space. Continuing the previous example, each wireless signal generator 108 may be placed by an art piece in various locations within a room that embodies all art pieces created by an artist. The reference data may be data explaining the history of the artist.

Further referring to FIG. 1, reference data may include any element of data described above, such as without limitation any element of regional descriptive data, safety data, or the like.

Continuing to refer to FIG. 1, data in system 100 may be selected as reference data by the use of a classification algorithm. Classification algorithm, discussed in further detail below, may derive reference data through the use of training data and classifiers. Data such as contextual data, user-entered data, and location specific data may be sorted into categories or bins. Output of a classification algorithm may include reference data. Training data may include user identified data that is considered reference data, such as a description of an artist, a map of a navigable space, a menu at a restaurant. Classification algorithm may be training with such data to determine reference data. Additionally or alternatively, reference data may be user determined, such that a user may assign data from a specific transmitter and/or wireless signal generator 108, as reference data. User may specify that a specific transmitter is a reference data transmitter such that any data associated with the transmitter may be considered reference data. User may store reference specific data in a database and designate that data be linked or copied directly into all transmitters/wireless signal generators associated with a location identifier. "Reference specific data," as used herein, is data that is designed as reference data. This may include without limitations, user-entered data or external data that may be referenced by multiple wireless signal generators.

With continued reference to FIG. 1, the element of reference data may include a localized data record previously transmitted and/or received by a wireless signal generator 108. In an embodiment, previously transmitted localized data records may be stored in a database, such as database 116. Database of previously transmitted localized data records may be accessed through any wireless signal generators and/or transmitters that contains the same location identifier as the previously transmitted localized data record. For example, a user may use a wireless receiver 112 to scan a wireless signal generator 108 located at an entrance lounge of an office building. Wireless signal generator may transmit a localized data record that includes a description of the entrance lounge as well as other localized data records that have been previously transmitted at the same nesting navigable space, the office building. For example, a user may be able to see other transmitters located in the nesting navigable space, such as the men's restroom, after scanning the wireless signal generator at the entrance lounge. The user may be able to select the men's restroom data record and be shown data about the men's restroom, such as navigation, location nested within the navigable space, or the like. In an embodiment, reference data may store information from other transmitters such that a user does not need to physically use a wireless receiver 112 or be at the location of a wireless signal generator to see the localized data record being transmitted at that wireless signal generator.

Still referring to FIG. 1, reference data may include, without limitation, a resource locator and/or identifier such as a uniform resource locator (URL), a uniform resource identifier (URI), a hyperlink, or the like. Resource locator may identify and/or form a link to an external device, server, database, or the like, such as a database operated by a manufacturer, merchant, governmental and/or industrial body such as the Food and Drug Administration (FDA), the United States Department of Agriculture (USDA), and/or Consumer Product Safety Commission; databases and/or resources may include without limitation databases and/or resources providing information concerning food safety, food nutritional content, drug safety including side-effects, risk factors, and/or interactions, drug indications and/or uses, drug active ingredients, product recall information, or the like.

Continuing to refer to FIG. 1, reference data may include source reference data. "Source reference data," as used in this disclosure, is reference data representing a "source" of an item such as a product and/or other item produced by human effort. A source may include a provider, designer, manufacturer, or other person and/or entity producing an item and/or one or more components thereof. A source may include a component and/or precursor of an item.

Still referring to FIG. 1, source data may include any data describing and/or pertaining to a source of an item. For instance, source data may describe medication original material and/or sources thereof, medication lot number, information for warnings, counterindications, side effects, recalls, indications, on-label uses, off-label uses, approved uses, medication lot number, or the like relating to medication and/or pharmaceuticals. Source data may describe ingredients in food, processes for producing the food, growth, fertilizer, pesticide, genetic modification, and/or other details concerning husbandry of produce, animal husbandry conditions, medications, feed, medication, hormones, or the like, nutrition information for any food item and/or ingredients thereof, sterilization, and/or pasteurization processes, information concerning food safety, or the like. Source data may include countries, geographical regions, states, provinces, geographical features or the like of origin for any item. Source data may include data describing parts for manufacturing appliances, automobiles, or the like, factories in which they were produced, lots in which they were produced, materials used, or the like. Source data may include product recall information.

In an embodiment, and with further reference to FIG. 1, a purpose of source data may be to retrieve, provide, and/or or add information for warnings, recalls, and/or other updated data and automatically provide that new information to any transmitter attached to an item containing a subset of the original "source" material. Source reference data may be copied from one transmitter to another, where "copying," may include copying an association and/or link to data as described in this disclosure; for instance, a first transmitter may be linked to a given element of source reference data in a data structure, and a second transmitter identifier may be obtained by scanning second transmitter and/or otherwise obtaining its identifier, and the given element of source reference data may be linked to the second transmitter identifier. As an example, source reference data may be copied from a transmitter on one container to a transmitter on other containers that will contain a subset of the contents of the first container; thus source data may be associated in turn with large containers to medication distributors smaller containers to hospitals, pharmacies, or the like, and/or containers at the consumer or patient such as pill bottles, individual doses or the like. Similarly, source data associated with a transmitter linked to and/or identifying a case and/or lot of parts may be copied to a transmitter linked to an assembly including one or more of such parts. Updates to source information may be linked to any transmitter identifier and/or location identifier as described in this disclosure, such that any transmitter identifier, or part, container, or the contents thereof linked to source data may be automatically linked to updated source data. As a result, scanning any such transmitter may give a computing device and/or user thereof updated source data information, so they may immediately be aware of recall data, new warnings, and/or any other new information relating to such items.

Still referring to FIG. 1, source reference data may be added and/or modified if a product is altered. In an exemplary process for adding and/or modifying source reference data, a user and/or automated manufacturing device may create their own source reference data for any alterations they have made to a product. User and/or device may add a transmitter to new containers or products; alternatively a transmitter may already be attached thereto and/or to a new container thereof. User and/or device may add source reference data to transmitter data. User and/or device may scan an original container and/or product containing and/or pertaining to elements incorporated in product; user, device, and/or a computing device may then retrieve all original source reference data. User and/or device may add all original "Source" reference data to transmitter data associated with new and/or modified product. Steps described above may be performed in any order as each "source" reference data is independent, and may be added to the transmitter data at any time. Updates of any kind may be linked to any and/or all identifiers linked to source data.

In some embodiments, and with further reference to FIG. 1, source reference data may be treated in a system as a specific type of reference data and may be designated as such to facilitate easy collection of all source reference data associated with an item. Source reference data may include and/or be organized, stored, and/or sorted according to one or more criteria such as lot number, manufacturer, date of manufacture, or location manufactured.

Continuing to refer to FIG. 1, in an illustrative example, source reference data may be used to record, track, and/or provide information regarding pharmaceuticals. Source data may be used, without limitation, to link warnings, updated side-effect/interaction data, updated indications and/or counter-indications, new approved use or the like to drugs and/or pharmaceutical products at every point in distribution and/or prescription from manufacture to delivery to a patient. Source data linked to a given set of pills, intravenous (IV) ingredients, compounding ingredients, or the like may include any information as described above. At a point of packaging, compounding, and/or dosage a big vat, container and/or of material may be associated with its transmitter, which may include and/or be linked to source data thereof; every time contents are subdivided, counted out, put in pill bottles, IV bags or the like, a user and/or device may scan and/or otherwise associate source data with a new container. As a result, any updates to source data may be associated with dosage level, compounding level, and/or any previous packaging of drugs, pharmaceutical products, or the like. Thus, recalls, new or previously not provided information concerning counterindications, side effects, interactions, uses, indications, directions, warnings, or the like may be propagated to medications, drugs, and/or pharmaceutical products at any or all points from manufacture to delivery at a patient.

As a further non-limiting example, and further referring to FIG. 1, source reference data may be added to transmitters associated with digital electronic products and/or equipment at each stage in manufacture. For instance, and without limitation, source data relating to chip dies may be associated with transmitters of such chip dies, and may then be copied to individual chip's transmitters, while being augmented with new information regarding such chips; later, when chips are added to an integrated circuit and/or embedded system, a transmitter thereof may be associated with chip and die source data, as well as with source data of other circuit elements and of the assembled circuit, embedded system, and/or product in which embedded system is included. Updates to security vulnerability information, recalls, firmware updates, and/or software updates may be described in updated source data.

Still referring to FIG. 1, plurality of display signals 128*a-n* includes an element of location-specific data. Computing device 104 may retrieve element of location-specific data from database 116, a remote device 120, or the like. Retrieval of plurality of location-specific data may be performed using solely location identifier. Alternatively or additionally, retrieval of plurality of location-specific data may be performed using at least a contextual datum. A "contextual datum" as used in this disclosure is any element of data, excepting location identifier, usable to select a subset of location-specific data. A contextual datum may include, without limitation, data describing a user. For instance, and without limitation, data describing a user may indicate whether a user is permitted to receive information describing how to operate and/or repair equipment. User access privileges, rights, and/or restrictions may be determined by determining user membership in one or more groups according to group information provided in a user profile, such as user membership in a military organization, user membership in a company or factory, a user position or rank, or the like. Group information may be information concerning a group of users related by a particular interest or other commonality. Data describing a user may, as an additional non-limiting example, specify a default user medical need, such as, without limitation, a user with a heart condition having a default medical need relating to treatment of arrhythmia, cardiac arrest, or the like. Any data entered or contained in system 100 with respect to and/or linked to unique identifier and/or any transmitter may be associated with one or more access levels or controls, including without limitation data limited to only a single user, data available only to a group of users, and/or data available to any user operating system 100 and/or any device or component included within system. Thus, for instance, a first user operating a computing device 104 as disclosed herein may be presented with a first set of information linked to at least a first transmitter, while a second user may be presented with a second set of information; first set may differ from second set, for instance and without limitation by exclusion from second set of private and/or group-related information linked to first user and not second user, and/or by inclusion of private and/or group-related information linked to second user and not first user. Further continuing the example, first set and second set may have in common data that is publicly available and/or data linked to a group in which both first user and second user are members.

Still referring to FIG. 1, data describing a user may be retrieved using a user identifier, which may be retrieved from memory of computing device 104 and/or another device in system 100. Retrieving user identifier may include retrieving an identifier unique to user; alternatively or additionally, retrieving user identifier may include retrieving one or more group identifiers linked to user identifier, where the group identifiers may, without limitation, identify groups of user identifiers having common interests, common needs for assistance or accommodation, or access privileges. For instance, may at least a group identifier may identify a group of users that are affiliated with an institution, company, business, or club, a group of users with a certain degree of visual or mobility impairment, or the like; each user identifier may be associated with one or many groups and/or group identifiers. Any group identifier may have any structure or contents suitable for use as a user identifier, and may be produced, generated, or received according to any process or using any device or module suitable for production, generation, or reception of a user identifier. Groups may be organized according to any common need for accommodation and/or class of impairment; for instance, a first group may be linked to visual impairment and concomitant need for usage instructions that do not rely on sight for performance, while a second group may be linked to a physical impairment such as lowered mobility or dexterity, such that usage instructions assume use of, for instance, tools to aid with reach, grip, or the like. Groups may include at least a group identified by a common interest, such as a hobby or profession; thus if user belongs to a group of mechanics, and item includes a device or element that may be repaired by a mechanic, usage instruction may be generated using stored steps or step sequences describing processes for repair or modification of item by a mechanic. Data describing a user may include an identifier of a user of computing device 104, a name, address, electronic mail address, account number, username, phone number, or other identifying and/or contact information of a user, one or more groups in which user is a member, and/or one or more accessibility needs the user is recorded as having.

Further referring to FIG. 1, display data structure 124 includes a display order for the plurality of data signals. Display order may include, without limitation, an initial display signal. of the plurality of display signals 128*a-n*. An "initial display signal" as used in this disclosure, is a display signal that display data structure 124 first currently displays. Initial display signal may depend on one or more elements of contextual data; for instance, and without limitation, initial display signal may be a first signal given a first set of contextual data and/or location identifier and a second display signal given a second set of contextual data and/or location identifier. A user may specify an initial display signal and/or an initial display signal per location identifier, per a given combination of location identifier and contextual datum and/or set of contextual data, or the like.

Alternatively or additionally, and still referring to FIG. 1, computing device 104 may determine selection of initial display signal given location identifier and/or contextual data. Selection of initial display signal may include selection of a default display signal; default may be a universal default, based on, for instance, a stored identifier of a default initial display, which may, in an embodiment, be selected in absence of any other data, such as without limitation for a new user that has not entered any information. Default signal may be location-specific, or in other words dependent on a navigable space in which computing device 104 is currently located. Default signal may be transmitter-specific, as selected for instance according to identifier of first transmitter. Default signal may be user-specific; for instance, computing device 104 and/or a remote device 120 in communication with computing device 104 may track user interactions with system 100 and identify a most frequently used display signal by user. Alternatively or additionally, selection of initial display signal may be performed by selection of a most frequently used display signal by user per another contextual datum, such as without limitation a display signal a user selects to use most frequently in a given location, at a given time, on a given weekday, at a given slot or moment in a schedule, after using a particular display signal, and/or any combination thereof.

In an embodiment, and still referring to FIG. 1, where multiple data such as first transmitter identifier and/or a plurality of contextual data are used in selecting initial display signal, selection of initial display signal may be performed using a classification algorithm. A "classification algorithm" is defined herein as a process whereby a computing device 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure.

Still referring to FIG. 1, classification algorithm may be implemented, as a non-limiting example, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of contextual data, potentially including first transmitter identifier, to a display signal of a plurality of display signals 128*a-n*.

In an embodiment, and still referring to FIG. 1, selection of initial display signal may include receiving an emergency notification and selecting an emergency display signal as a function of the emergency notification. Emergency notification may include, without limitation, data received over a network or the like that an emergency is currently underway, such as without limitation a current fire, tornado, flood, earthquake, terrorist attack, and/or active shooter, data received over a network or the like of an elevated probability of an emergency, such as without limitation a "watch" or "warning" of one or more potential emergencies such as fire, flood, tornado, and/or criminal or terrorist activity. Selection based on emergency notification may be used in conjunction with any or all other methods as described above; for instance, other display signals 128*a-n* may be placed in order of display after emergency display signal. Upon lapse of emergency, as for instance indicated by a subsequent communication over a network or the like of cessation of an emergency or reduction of probability of the emergency, such as cancelation of a "watch" or "warning," computing device 104 may select a new initial display tab using any or all methods described above, and may display the new initial display tab.

Still referring to FIG. 1, display order may include an order in which display signals 128*a-n* are provided chronologically and/or temporally. Order of display may depend on position data. Alternatively or additionally, selection of a second display signal, third display signal, and the like may be performed by repeating any display selection process described above with previously selected display signals 128*a-n* excluded from a set from which an instant display signal is to be selected. In an embodiment, display data structure 124 and/or computing device 104 may be configured to redetermine initial display signal periodically and/or upon detection of an event such as receipt of an external signal containing new and/or modified contextual data. For instance, display data structure 124 and/or computing device 104 may be configured to select a different display signal upon reception of data indicating that an emergency is taking place, that a class is starting, or the like.

Still referring to FIG. 1, computing device 104 is configured to record at least an element of contextual data. At least an element of contextual data may include any element of contextual data as described above. At least an element of contextual data may include at least an element of reference data. At least an element of contextual data may be recorded by capture, reception, retrieval or the like of contextual data according to any process described above.

Still referring to FIG. 1, computing device 104 is configured to generate a localized data record. A "localized data record," as used in this disclosure, is a data structure linking location identifier to one or more elements of data. Localized data record includes display data structure 124, location identifier, and an association of the at least an element of contextual data with the display order. Localized data record may be stored in a database 116. Database 116 may be implemented, without limitation, as a relational database 116, a key-value retrieval database 116 such as a NOSQL database 116, or any other format or structure for use as a database 116 that a person skilled in the art would recognize as suitable upon review of the entirety of this disclosure. Database 116 may alternatively or additionally be implemented using a distributed data storage protocol and/or data structure, such as a distributed hash table or the like. Database 116 may include a plurality of data entries and/or records as described above. Data entries in a database 116 may be flagged with or linked to one or more additional elements of information, which may be reflected in data entry cells and/or in linked tables such as tables related by one or more indices in a relational database 116. Persons skilled in the art, upon reviewing the entirety of this disclosure, will be aware of various ways in which data entries in a database 116 may store, retrieve, organize, and/or reflect data and/or records as used herein, as well as categories and/or populations of data consistently with this disclosure. Retrieval from database 116 using location identifier may be performed according to any process and/or process steps described above for retrieval of data using an identifier received and/or extracted from a wireless. "Location-specific data" as used herein is data that is retrieved based on the location identifier. Location-specific data may include any data belonging to any categories as described below. Database 116 may be edited by any computing device, as permitted according to access rules as described in this disclosure. For instance, and without limitation, computing device 104 and/or one or more remote devices may be able to remotely create and/or edit database 116 whether at wireless signal generator 108 and/or at other locations. One or more additional computing devices may be linked to remote device 120 and/or in communication therewith.

Further referring to FIG. 1, computing device 104 may be further configured to perform display of display data structure 124. For instance, and without limitation, computing device 104 may display initial display signal at a user output component. Displaying the initial display signal may include displaying data belonging to the subset of the plurality of categories of data included in the initial display signal. Association of at least an element of contextual data with a display order may include an association of an initial display signal of plurality of display signals 128a-n with an element of the at least an element of contextual data. This may be accomplished without limitation, according to any process as described above or below. Display may be performed according to display order; for instance, computing device 104 may select initial display signal and display initial display signal.

Still referring to FIG. 1, system 100 and/or computing device 104 may include a user output device 132. User output device 132 may include a display 136; the display 136 may be any display as described below. Display 136 may be a display of a mobile device such as a smartphone or tablet. User output device 132 may include an audio output device, such as a speaker, headphones, or a wireless headset such as those typically paired to a mobile device. User output device 132 may include a tactile output device. In some embodiments, tactile output device is a device that outputs information that is intelligible using the sense of touch. Tactile output device may include a haptic output device such as a vibrator of a mobile device such as a smartphone, cellular phone, or tablet. In some embodiments, tactile output device produces patterns having geometric forms that are intelligible to the user using the sense of touch; for instance, tactile output device may output letters in braille using a set of retractable pins or bumps that can be extended and retracted to form braille characters, similarly to devices used with screen readers. Tactile output device may output other recognizable shapes, such as directional arrows or geometric forms; tactile output device may, as another example, output a map vignette of the immediate area including user features or any user feature data as described above. User output device 132 may be coupled to a mobile device; for instance, where computing device 104 includes a mobile device, user output device 132 may be coupled to the same mobile device. User output device 132 may be incorporated wholly or in part in a mobile device; for instance, user output device 132 may include the display 136 and speakers of the mobile device, as well as a tactile output device coupled to the mobile device. User output device 132 may be coupled directly to wireless receiver 112 and/or computing device 104 or may communicated with wireless receiver 112 and/or computing device 104 via a network; user output device 132 may be incorporated in or include a computing device 104 and/or any element thereof, including without limitation a processor, wireless or wired communication input/output devices, navigation facilities, and the like. User output device 132 is configured to receive data from computing device 104; data may be received from computing device 104 by any suitable electronic or wireless means. User output device 132 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display 136, such as a mobile phone or tablet screen, or displaying large symbols such as directional arrows on the display 136. Similarly, if the user is visually impaired but able to hear, providing data may involve presenting the data by means of an audio output device. Where the user is not able to see or hear, presenting the regional descriptive data may include providing data using a tactile device. Providing data may also involve a combination of the above-described means; for instance, the regional descriptive data may be presented to the user in audio form, combined with large display of directional arrows or type, or with tactile information. User output device 132 may also be able to output content data. User output device 132 may also be able to output product data. Computing device 104 may cause display of display data structure 124 at user output device 132. User output device may include one or more holographic, augmented reality, and/or virtual reality displays, including without limitation heads-up displays, eye taps, augmented reality and/or virtual reality goggles and/or headsets, or the like.

With continued reference to FIG. 1, computing device 104 may be configured to retrieve and/or display one or more portions or aspects of display data structure 124. Computing device 104 may, as a non-limiting example, receive, from a wireless signal generator 108 located in a navigable space, a location identifier; reception may be performed in any manner described above. In an embodiment, computing device 104 may have location identifier stored in memory of computing device 104. Computing device 104 may retrieve, from a database 116, and using location identifier, a plurality of location-specific data. Database 116 may include any database 116, database 116, and/or data structure described above. Retrieval from database 116 using location identifier may be performed according to any process and/or process steps described above for retrieval of data using an identifier received and/or extracted from a wireless. "Location-specific data" as used herein is data that is retrieved based on the location identifier. Location-specific data may include any data belonging to any categories as described below.

Still referring to FIG. 1, plurality of location-specific data may include a plurality of categories of data as described below. Retrieval of plurality of location-specific data may be performed using solely location identifier. Alternatively or additionally, retrieval of plurality of location-specific data may be performed using at least a contextual datum, which may include any contextual data and/or datum as described above.

Still referring to FIG. 1, user-entered data may be retrieved using a user identifier, which may be retrieved from memory of computing device 104 and/or another device in system 100. Retrieving user identifier may include retrieving an identifier unique to user; alternatively or additionally, retrieving user identifier may include retrieving one or more group identifiers linked to user identifier, where the group identifiers may, without limitation, identify groups of user identifiers having common interests, common needs for assistance or accommodation, or access privileges. For instance, may at least a group identifier may identify a group of users that are affiliated with an institution, company, business, or club, a group of users with a certain degree of visual or mobility impairment, or the like; each user identifier may be associated with one or many groups and/or group identifiers. Any group identifier may have any structure or contents suitable for use as a user identifier, and may be produced, generated, or received according to any process or using any device or module suitable for production, generation, or reception of a user identifier. Groups may be organized according to any common need for accommodation and/or class of impairment; for instance, a first group may be linked to visual impairment and concomitant need for usage instructions that do not rely on sight for performance, while a second group may be linked to a physical impairment such as lowered mobility or dexterity, such that usage instructions assume use of, for instance, tools to aid with reach, grip, or the like. Groups may include at least a group identified by a common interest, such as a hobby or profession; thus if user belongs to a group of mechanics, and item includes a device or element that may be repaired by a mechanic, usage instruction may be generated using stored steps or step sequences describing processes for repair or modification of item by a mechanic. User-entered data may include an identifier of a user of computing device 104, a name, address, electronic mail address, account number, username, phone number, or other identifying and/or contact information of a user, one or more groups in which user is a member, and/or one or more accessibility needs the user is recorded as having.

With continued reference to FIG. 1, contextual data may be used to refine a query to one or more data sources, for instance and without limitation by generating a query to database 116 that includes one or more contextual data in addition to identifier of first transmitter. Alternatively or additionally, contextual data may be used to select one or more databases, tables, and/or other repositories of data included in database 116 to which a query may be submitted. As a non-limiting example, retrieval of data from database 116 may be on a "need to know" and/or user role or group-specific basis, such as retrieval of wiring information to provide to electricians, or other examples as described in further detail below.

Still referring to FIG. 1, computing device 104 generates a user-interfacing data structure including a plurality of display signals 128*a-n*. Each display signal of plurality of display signals 128*a-n* includes a subset of the plurality of categories of data, and each subset of the plurality of display signals 128*a-n* differs from each other subset of the plurality of display signals 128*a-n*. A first subset of the plurality of categories of data may differ from a second subset of the plurality of categories of data.

Further referring to FIG. 1, computing device 104 may select an initial display signal. This may be performed according to any process and/or using any selection criteria for selection of an initial display signal as described above; initial display signal may be selected, without limitation, using contextual data, location-specific data, data describing user, or the like. Displaying initial display signal may include displaying data belonging to the subset of the plurality of categories of data included in the initial display signal. Data to be displayed in display signal may be determined as described above. In an embodiment, computing device 104 may determine an order of display signals 128*a-n*. Order of signals may be determined by ranking display signals 128*a-n* according to frequency of use, frequency of use per contextual datum, and/or degree of proximity to first transmitter identifier and a plurality of contextual data according to a classifier as described above; for instance, where classifier is a KNN classifier, initial display signal may be a nearest display signal, a next-nearest display signal may be next in order of display, and so forth. Order of display may, for instance, place initial display signal on "top" with a next adjacent tab or the like being for the next display signal in order of display, and subsequent tabs or the like for subsequent elements in order of display.

Still referring to FIG. 1, computing device 104 may detect an event that triggers a change in current display signal. Event may include user selection of another display signal of plurality of display signals 128*a-n*. Event may include receiving an external signal received such as an emergency notification as described above, a signal from another transmitter, which may be any transmitter suitable for use as first transmitter as described above, a passage of some period of time, a change in schedule, completion of a process and/or task on current display signal, or the like. Switch to a new current display signal may be performed, without limitation, by selecting new current display signal according to any process and/or process step described above, including without limitation using contextual data, a classifier, or the like.

Further referring to FIG. 1, computing device 104 may display initial display signal at a user output component. Displaying initial display signal may include displaying data belonging to the subset of the plurality of categories of data included in the initial display signal. Initial display signal may be selected according to any criteria described above, including without limitation contextual data, data describing a user, location-specific data, and/or location identifiers. For instance, computing device may provide different location-specific data, different display signals, and/or different selections of display signals for different people based on roles, categories of people, group membership, or the like. In an embodiment, users may be able to add data, for instance to be linked to location identifier and a user identifier of such users; such data may be stored locally and/or in a user-linked data record, which may be created as described above. Note that location-specific data record may receive location-specific data and/or user-entered data by receiving data from a previous location-specific data record; thus, methods described herein may be performed iteratively and/or recursively. In an embodiment, a user may be able to edit only data records and/or display data structures created by that user and/or a group of users to which that user belongs. A user may enter commands traversing data, for instance by "playing" through in a default order as described above and/or in an order specified by one or more user entries, including activation of scroll buttons, verbal commands to go up or down, commands to traverse blocks of a given type, and/or by one or more touch-screen actions such as "swiping," "sliding," or other actions, which may be specified to be in a given direction such as up, down, left, right, or the like.

Figure 2A:
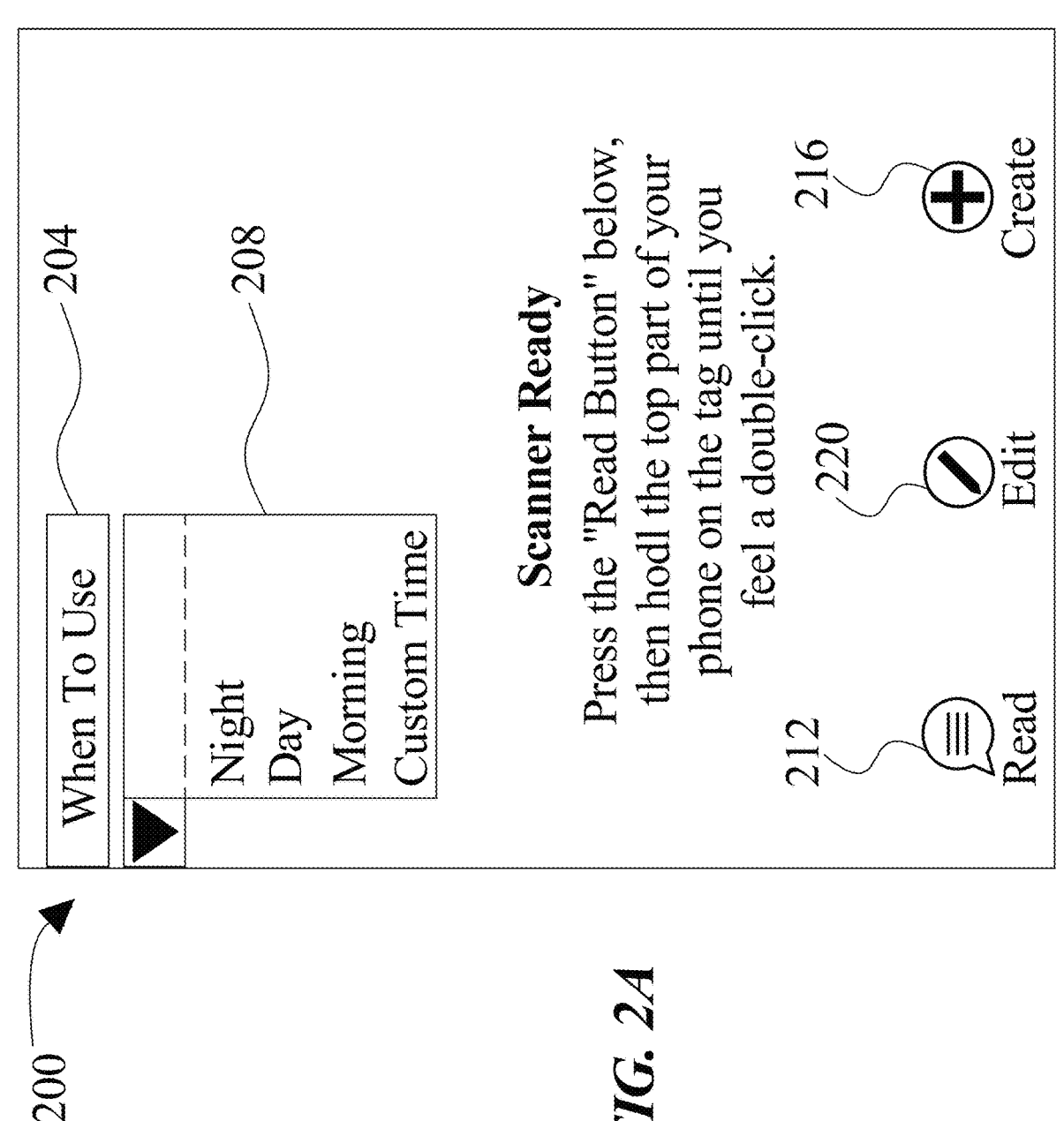
FIGS. 2A-B are block diagrams of an exemplary embodiment of an input user interface.

Referring now to FIG. 2A, an exemplary embodiment of an input user interface 200 for input of user-entered data as described above is provided. Input user interface 200 may be provided to a user via user output device 132; input user interface 200 may be provided according to any output device and/or procedure described above, including without limitation display, audio output including without limitation text-to-speech output, tactile output, or the like. Input user interface 200 may include an input prompt 204 directing a user to input one or more elements of data and/or describing how to input such one or more elements. Input user interface 200 may include an input field 208 in which a user can input data, for instance by selection of one or more options, entry of text, browsing for locally stored data such as images, videos, and/or audio files, capture of data such as images, videos, and/or audio files using input devices, or the like. A "read" button 212 may enable a user to receive location identifier and/or other identifiers or data from wireless signal generator. Selection of a "create" button 216 may enable a user to enter a new block of data. Block of data may be of any suitable type, including without limitation a text field, a heading field, a link field, an image filed, an audio field, a date field, a time filed, a video field, an email field, and/or a phone field. Selection of any such block type may cause display of a template for entry of data corresponding to that block type. For instance, and without limitation, any block template may permit entry of a label for a block to be created, fields such as link and/or image fields may permit entry of hyperlinks such as URL hyperlinks or the like, fields that may not display and/or be accessible for certain users may provide alt-text fields describing what cannot be detected under some circumstances, and for block types for which browsing and/or capture is appropriate, such as image, video, and/or audio block types, fields for browsing and/or capture may be provided. There may also be "custom" fields, which may permit a user to specify a content type of a field. A user may be able to set and/or modify access and/or edit permissions for a block, for instance limiting to the user, permitting access and/or editing for members of a given group of users, permitting access and/or editing for users of a given category, permitting access and/or editing for all users, or the like. Time fields and/or date fields may alternatively or additionally be populated by a timestamp using a current time as of creation and/or user activation of a button or event handler for generation of timestamp. An "edit" button 220 may recall one or more blocks for editing and/or permit editing of display of blocks by, for instance, changing order thereof or the like.

Figure 2B:

Referring now to FIG. 2B, an exemplary embodiment of a view in input data structure 200 is provided showing a plurality of blocks 224a-b. Each block of plurality of blocks may be moved up or down in display and/or traversal order as described above. Each block may have an edit button 228 for modification, addition, and/or removal of fields. Edit button may alternatively or additionally be activated to add another block of information. An "actions" button 232 may be provided to edit a block by performing one or more actions on the block, such as providing users with additional actions such as modifying a position in an order, changing access and/or edit permissions, deletion, addition before or after block of a new block, or the like. Any standard method of adding information may be employed, including without limitation any manner described above for entry of user-entered data. Any method of performing actions on items may be employed, including without limitation creating a selection set of items and right-clicking or otherwise entering a command to see actions that can be applied or selecting a menu/list of actions that can be applied. Persons skilled in the art, upon reviewing the entirety of this disclosure, will be aware of various alternative of additional ways in which editing and/or addition of data may be performed. Editing may permit a user to modify an image shape, for instance making the image square, round, fade out, be a wallpaper/background, or the like. A user may be able to add metadata using actions button 232 or the like. A user may be able to add additional blocks at a top or bottom of display view and/or display signal.

Figure 3:
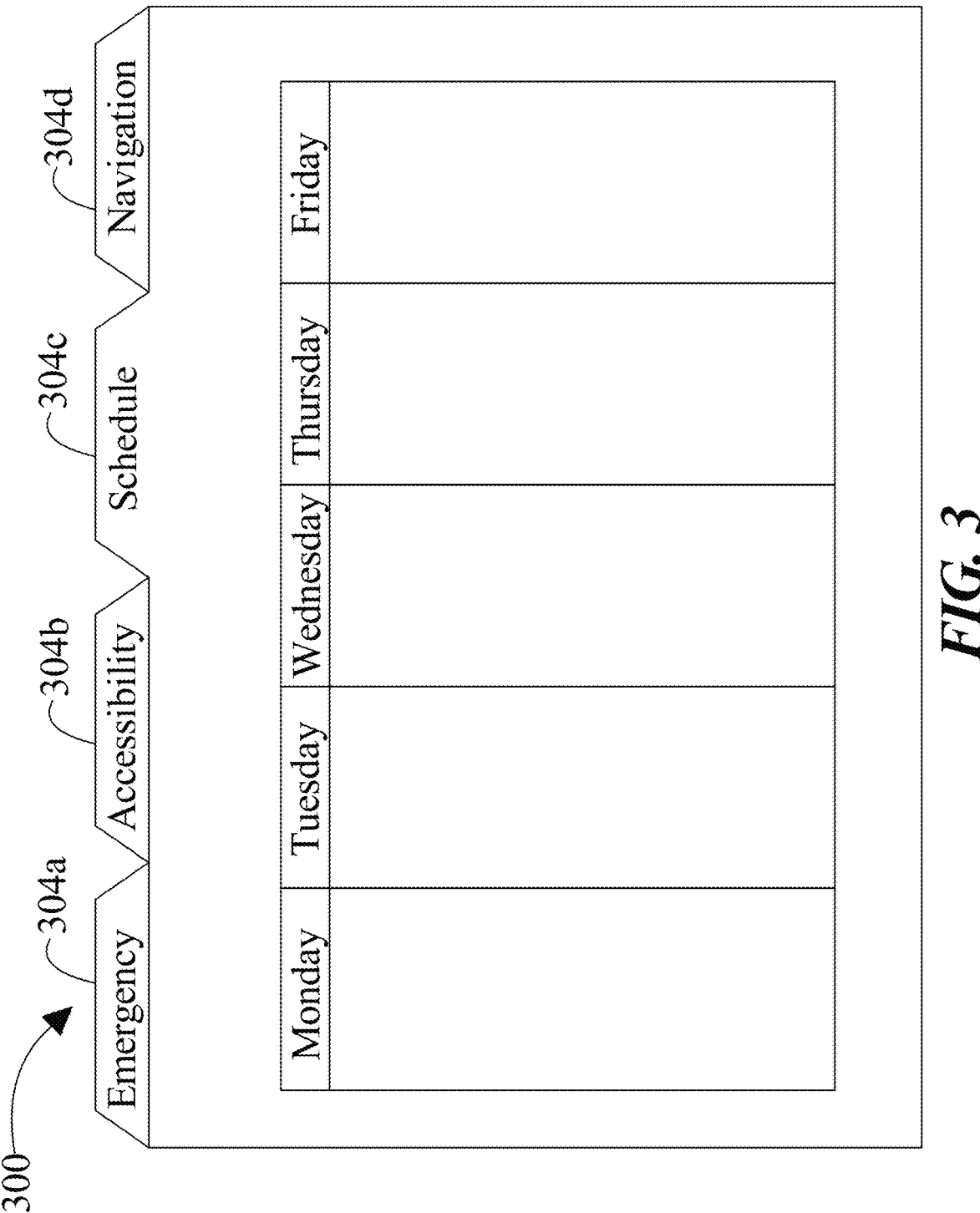
FIG. 3 is a block diagram of an exemplary embodiment of an output of a display data structure to a display.

Referring now to FIG. 3, an exemplary embodiment of an output 300 of a display data structure 124 to a display is illustrated. Output 300 may provide a user a current display view 304c of a plurality of display views 304a-d, displaying a current display signal of a plurality of display signals 128a-n, where a current display view 304c may be a view outputting a display signal of a plurality o of display signals 128a-n selected by user and/or according to systems and/or methods described below. User may be able to toggle and/or switch between display views 304a-d, for instance by selecting tabs, links, buttons, or the like that command user interfacing data structure and/or display to select a different display signal of plurality of display signals 128a-n 304a-d to display; selection of a different display signal and/or view by user and/or an automated process may cause that display signal to become a current display signal, output in a current display view, and replace the previous current display signal. Toggling between display signals 128a-n and/or views may be performed, as an additional non-limiting example, by one or more programs and/or functions, which may start automatically and/or in response to any user input and/or command.

Figure 4:
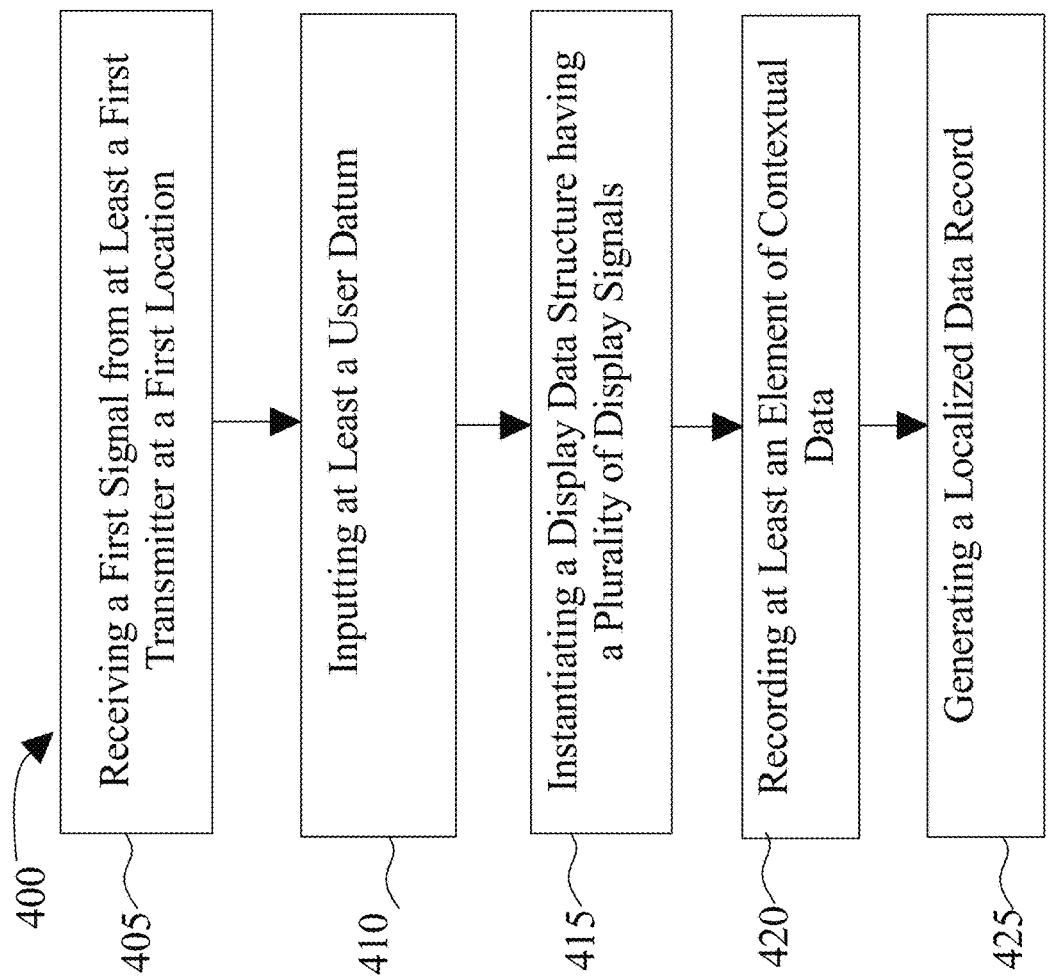
FIG. 4 is a flow diagram of an exemplary embodiment of a method of localized information provision using wireless communication.

Referring now to FIG. 4, an exemplary embodiment of a method 400 of localized information provision using wireless communication is illustrated. At step 405, a computing device 104 receives, from a wireless signal generator 108 located in a navigable space, a location identifier; this may be implemented, without limitation, as described above in reference to FIGS. 1-3. Receiving location identifier may include wirelessly transmitting, via an antenna communicatively connected to the computing device 104, an interrogation signal providing electrical power to wireless signal generator 108, and wirelessly receiving from the wireless signal generator 108, and via the antenna, a return signal.

At step 410, and still referring to FIG. 4, computing device 104 inputs at least a user-entered data associated with location identifier; this may be implemented, without limitation, as described above in reference to FIGS. 1-3.

At step 415, and with continued reference to FIG. 4, computing device 104 instantiates a display data structure 124 as a function of at least a user-entered datum; this may be implemented, without limitation, as described above in reference to FIGS. 1-3. Display data structure 124 includes a plurality of data signals including at least a user-entered datum. Each display signal of plurality of display signals 128a-n includes a subset of a plurality of categories of data. Display data structure 124 includes a display order for plurality of data signals. Each subset of plurality of display signals 128a-n may differ from each other subset of the plurality of display signals 128a-n. Display order may include an initial display signal of plurality of display signals 128a-n. Plurality of display signals 128a-n may include an element of location-specific data.

At step 420, and still referring to FIG. 4, computing device 104 records at least an element of contextual data; this may be implemented, without limitation, as described above in reference to FIGS. 1-3. At least an element of contextual data may include at least a past user interaction. At least an element of contextual data may include an element of temporal information. At least an element of contextual data may include an element of emergency information.

At step 425, and continuing to refer to FIG. 4, computing device 104 generates a localized data record; this may be implemented, without limitation, as described above in reference to FIGS. 1-3. Localized data record further includes display data structure 124. Localized data record includes location identifier. Localized data record includes an association of at least an element of contextual data with display order. Association of at least an element of contextual data with display order may include an association of an initial display signal of plurality of display signals 128a-n with an element of the at least an element of contextual data. Computing device 104 may display the display data structure 124.

Figure 5:
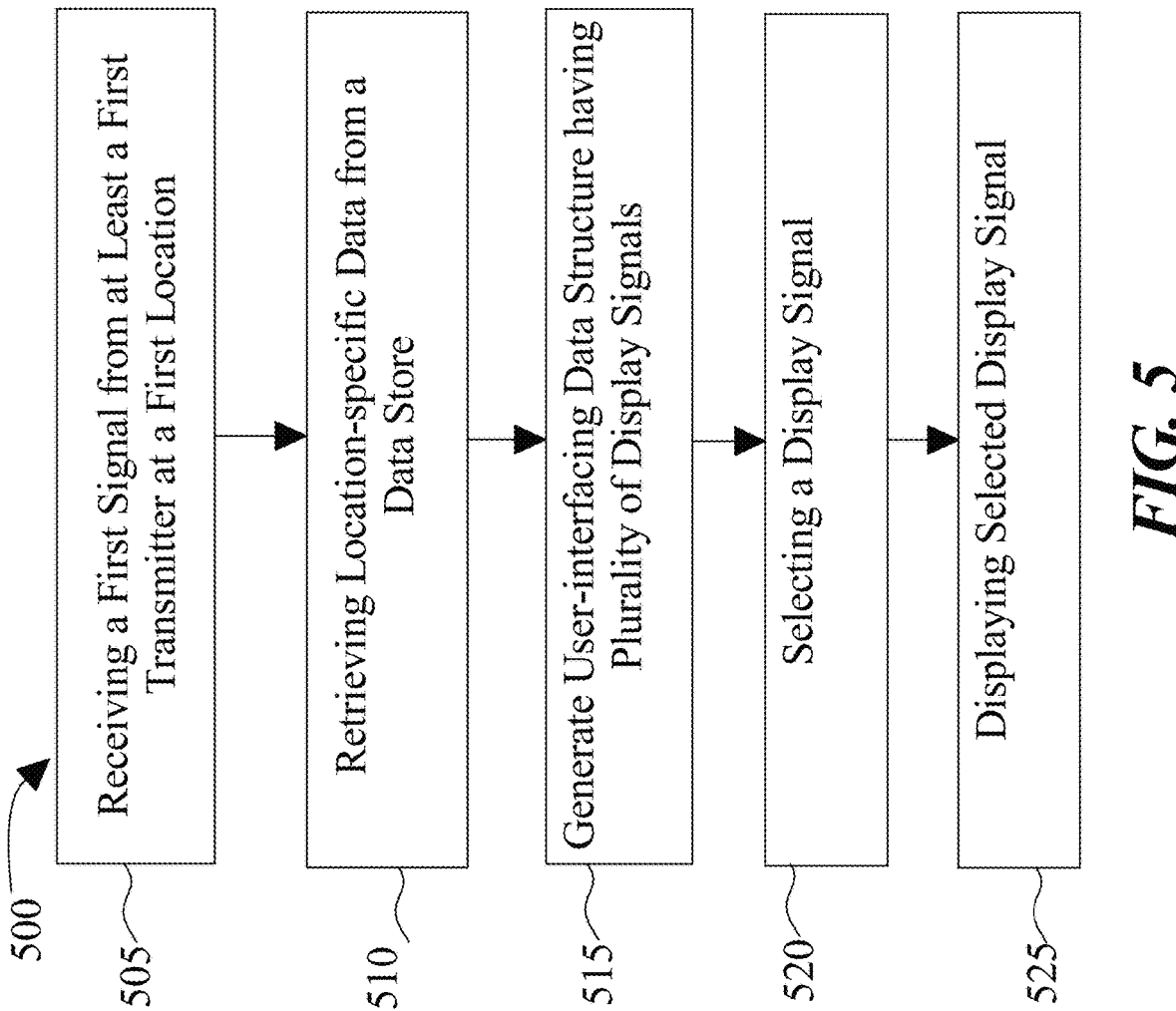
FIG. 5 is a flow diagram of an exemplary embodiment of a method of localized information provision using wireless communication.

Referring now to FIG. 5, an exemplary embodiment of a method 500 of localized information provision using wireless communication is illustrated. At step 505, computing device 104 receives, from a wireless signal generator 108 located in a navigable space, a location identifier; this may be implemented, without limitation, as described above in reference to FIGS. 1-4.

At step 510, and still referring to FIG. 5, computing device 104 retrieves, from a database 116, and using the location identifier, a plurality of location-specific data, wherein the plurality of location-specific data includes a plurality of categories of data; this may be implemented, without limitation, as described above in reference to FIGS. 1-4.

At step 515, and with continued reference to FIG. 5, computing device 104 generates a display data structure 124 having a plurality of display signals 128a-n; this may be implemented, without limitation, as described above in reference to FIGS. 1-4. Each display signal of plurality of display signals 128a-n includes a subset of plurality of categories of data. Each subset of the plurality of display signals 128a-n may differ from each other subset of the plurality of display signals 128a-n.

At step 520, and still referring to FIG. 5, computing device 104 selects an initial display signal of plurality of display signals 128a-n; this may be implemented, without limitation, as described above in reference to FIGS. 1-4.

At step 525, and continuing to refer to FIG. 5, computing device 104 displays initial display signal at a user output component; this may be implemented, without limitation, as described above in reference to FIGS. 1-4. Displaying the initial display signal includes displaying data belonging to subset of plurality of categories of data included in initial display signal.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
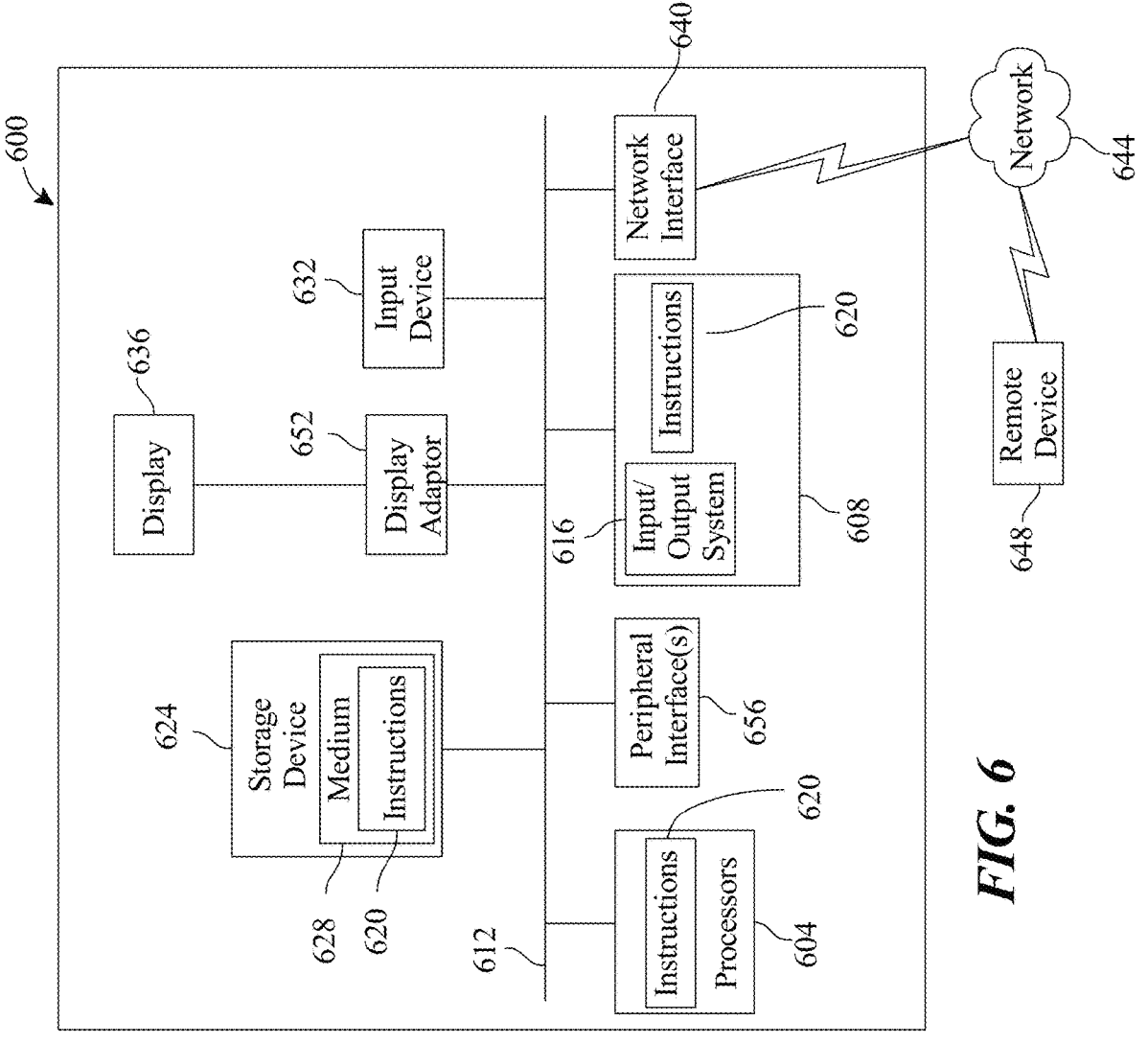
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for localized information provision using wireless communication, The system comprising a computing device comprising circuitry designed and configured to:

download, at a first location, a localized data record associating at least an element of contextual data with a display data structure, wherein the contextual data comprises source reference data regarding pharmaceuticals;

receive, from a wireless signal generator located at a second location, a location identifier;

retrieve the display data structure from the localized data record;

record at least an element of contextual data, wherein the at least an element of contextual data comprises stylistic data, and wherein the stylistic data comprises at least a shortcut for data entries captured optically; and instantiate the display data structure as a function of the at least an element of contextual data and the localized data record.

2. The system of claim 1, wherein the source reference data comprises updated data regarding an original source material to be provided to any transmitter attached to a container of a pharmaceutical product containing a subset of the original source material.

3. The system of claim 1, wherein the source reference data comprises at least an association between updated interaction data with at least a pharmaceutical product.

4. The system of claim 1, wherein the computing device is further configured to determine a user access privilege to the source reference data based on a user identifier.

5. The system of claim 4, wherein the user identifier comprises information related to a medical need of a user.

6. The system of claim 1, wherein the display data structure comprises:

a plurality of display signals, wherein each display signal comprises at least one element of source reference data that is not present in a remaining plurality of display signals.

7. The system of claim 6, wherein each display signal is associated with a user access privilege.

8. The system of claim 1, wherein the display data structure comprises a default initial display.

9. The system of claim 1, wherein instantiating the display data structure comprises selecting a display signal based on an user access privilege associated with a user identifier.

10. The system of claim 9, wherein selection of the display signal is determined using a classification algorithm.

11. A method for localized information provision using wireless communication, the method comprising:

downloading, using a computing device comprising circuitry, at a first location, a localized data record associating at least an element of contextual data with a display data structure, wherein the contextual data comprises source reference data regarding pharmaceuticals;

receiving, using the computing device, from a wireless signal generator located at a second location, a location identifier;

retrieving, using the computing device, the display data structure from the localized data record;

recording, using the computing device, at least an element of contextual data, wherein the at least an element of contextual data comprises stylistic data, and wherein the stylistic data comprises at least a shortcut for data entries captured optically; and instantiating, using the computing device, the display data structure as a function of the at least an element of contextual data and the localized data record.

12. The method of claim 11, wherein the source reference data comprises updated data regarding an original source material to be provided to any transmitter attached to container of a pharmaceutical product containing a subset of the original source material.

13. The method of claim 11, wherein the source reference data comprises at least an association between updated interaction data with at least a pharmaceutical product.

14. The method of claim 11, wherein the computing device is further configured to determine a user access privilege to the source reference data based on a user identifier.

15. The method of claim 14, wherein the user identifier comprises information related to a medical need of a user.

16. The method of claim 11, wherein the display data structure comprises:

a plurality of display signals, wherein each display signal comprises at least one element of source reference data that is not present in a remaining plurality of display signals.

17. The method of claim 16, wherein each display signal is associated with an user access privilege.

18. The method of claim 11, wherein the display data structure comprises a default initial display.

19. The method of claim 11, wherein instantiating the display data structure comprises selecting a display signal based on an user access privilege associated with a user identifier.

20. The method of claim 19, wherein selection of the display signal is determined using a classification algorithm.

* * * * *